United States Patent
Rister et al.

(10) Patent No.: US 12,333,283 B2
(45) Date of Patent: Jun. 17, 2025

(54) ITERATIVE COMPILATION TO OPTIMIZE TRANSLATION IN RECONFIGURABLE DATAFLOW ARCHITECTURES

(71) Applicant: SambaNova Systems, Inc., Palo Alto, CA (US)

(72) Inventors: Blaine Rister, San Francisco, CA (US); Haocheng Dong, San Jose, CA (US); David Alan Koeplinger, Egg Harbor, NJ (US); Yaqi Zhang, Foster City, CA (US); Junjue Wang, Newark, CA (US); Zhuo Chen, Palo Alto, CA (US); Arvind Sujeeth, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 116 days.

(21) Appl. No.: 18/129,718

(22) Filed: Mar. 31, 2023

(65) Prior Publication Data
US 2023/0315406 A1    Oct. 5, 2023

Related U.S. Application Data

(60) Provisional application No. 63/331,696, filed on Apr. 15, 2022, provisional application No. 63/331,116, (Continued)

(51) Int. Cl.
G06F 9/44 (2018.01)
G06F 8/41 (2018.01)

(52) U.S. Cl.
CPC .................................. G06F 8/433 (2013.01)

(58) Field of Classification Search
None
See application file for complete search history.

(56) References Cited

U.S. PATENT DOCUMENTS 10,768,979 B2 *   9/2020   Williams .............. G06F 9/4881
11,080,227 B2     8/2021   Koeplinger et al.
(Continued)

FOREIGN PATENT DOCUMENTS

WO        2010142987 A1    12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Qamrun Nahar
(74) *Attorney, Agent, or Firm* — Flagship Patents; Sikander M. Khan; Bruce A. Young

(57) ABSTRACT

In a method a compiler performs a trial compilation to a low level (LL) intermediate representation (IR) of a high level (HL) decision to execute a dataflow application on a computing system. The LLIR comprises hardware resources to execute the application based on the HL decision and the compiler determines a trial result based on LL execution metrics associated with the trail compilation. The compiler performs a trial compilation of a second HL decision to a second LLIR and determines a trial result based on LL execution metrics associated with the second trail compilation. The compiler evaluates the trial results and, based on the evaluations, selects one or both of the HL decisions for executing the dataflow application. A computer program product and a computing system can implement the method.

20 Claims, 9 Drawing Sheets

Related U.S. Application Data filed on Apr. 14, 2022, provisional application No. 63/330,730, filed on Apr. 13, 2022, provisional application No. 63/330,740, filed on Apr. 13, 2022, provisional application No. 63/327,313, filed on Apr. 4, 2022, provisional application No. 63/326,762, filed on Apr. 1, 2022, provisional application No. 63/326,206, filed on Mar. 31, 2022.

(56) References Cited

U.S. PATENT DOCUMENTS

| | | | |
|---|---|---|---|
| 11,163,546 B2* | 11/2021 | Rong | G06F 8/447 |
| 11,195,080 B1 | 12/2021 | Nama et al. | |
| 11,227,207 B1 | 1/2022 | Nama et al. | |
| 11,410,027 B2 | 8/2022 | Chen et al. | |
| 2021/0049465 A1* | 2/2021 | Bogdan | G06F 8/443 |
| 2021/0365248 A1* | 11/2021 | ChoFleming, Jr. | G06F 8/433 |
| 2022/0012028 A1* | 1/2022 | Yount | G06F 8/4441 |

OTHER PUBLICATIONS

List of related cases, Jun. 6, 2024, 2 pages.
M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
Podobas et al., A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.
U.S. Appl. No. 16/239,252 Final Office Action, dated Jan. 8, 2020, 13 pages.
U.S. Appl. No. 16/239,252—Notice of Allowance dated Feb. 12, 2020, 10 pages.
U.S. Appl. No. 16/239,252—Office Action dated Aug. 7, 2019, 8 pages.
U.S. Appl. No. 16/239,252—Response to Final Office Action dated Jan. 8, 2020, filed Jan. 24, 2020, 14 pages.
U.S. Appl. No. 16/239,252—Response to Office Action dated Aug. 7, 2019, filed Sep. 26, 2019, 6 pages.
U.S. Appl. No. 17/216,651 Non-Final Rejection, dated Jul. 13, 2021, 12 pages.
U.S. Appl. No. 17/216,651 Notice of Allowance, dated Aug. 5, 2021, 14 pages.
U.S. Appl. No. 17/216,651 Response to First Office Action, dated Jul. 13, 2021, filed Jul. 23, 2021, 14 pages.
U.S. Appl. No. 17/216,652 Non-Final Rejection, dated Aug. 2, 2021, 24 pages.
U.S. Appl. No. 16/239,252—Notice of Allowance dated May 14, 2020, 15 pages.

* cited by examiner

ITERATIVE COMPILATION TO OPTIMIZE TRANSLATION IN RECONFIGURABLE DATAFLOW ARCHITECTURES

CROSS-REFERENCE AND INCORPORATIONS

This application claims the benefit of U.S. Provisional Patent Application No. 63/327,313 filed Apr. 4, 2022, which is incorporated by reference herein in its entirety.

This application further claims the benefit of U.S. Provisional Patent Application No. 63/330,730 filed Apr. 13, 2022, which is incorporated by reference herein in its entirety.

This application further claims the benefit of U.S. Provisional Patent Application No. 63/330,740 filed Apr. 13, 2022, which is incorporated by reference herein in its entirety.

This application further claims the benefit of U.S. Provisional Patent Application No. 63/326,206 filed Mar. 31, 2022, which is incorporated by reference herein in its entirety.

This application further claims the benefit of U.S. Provisional Patent Application No. 63/326,762 filed Apr. 1, 2022, which is incorporated by reference herein in its entirety.

This application further claims the benefit of U.S. Provisional Patent Application No. 63/331,116 filed Apr. 14, 2022, which is incorporated by reference herein in its entirety.

This application further claims the benefit of U.S. Provisional Patent Application No. 63/331,696 filed Apr. 15, 2022, which is incorporated by reference herein in its entirety.

The following are incorporated by reference for all purposes as if fully set forth herein:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- U.S. Nonprovisional patent application Ser. No. 16/239,252, filed Jan. 3, 2019, titled "VIRTUALIZATION OF A RECONFIGURABLE DATA PROCESSOR,";
- U.S. Nonprovisional patent application Ser. No. 16/536,192, filed Aug. 8, 2019, entitled "COMPILER FLOW LOGIC FOR RECONFIGURABLE ARCHITECTURES,";
- U.S. Nonprovisional patent application Ser. No. 16/572,527, filed Sep. 16, 2019, entitled "PERFORMANCE ESTIMATION-BASED RESOURCE ALLOCATION FOR RECONFIGURABLE ARCHITECTURES,";
- U.S. Nonprovisional patent application Ser. No. 17/216,651, filed Mar. 29, 2021, entitled "LOSSLESS TILING IN CONVOLUTION NETWORKS—TILING CONFIGURATION,"; and,
- U.S. Nonprovisional patent application Ser. No. 17/216,652, filed Mar. 29, 2021, entitled "LOSSLESS TILING IN CONVOLUTION NETWORKS—SECTION BOUNDARIES,".

FIELD OF THE TECHNOLOGY

The technology disclosed relates to dataflow computing, such as neural networks in machine learning and artificial intelligence computing systems. In particular, the technology disclosed relates to compilers for computing systems using reconfigurable processors, such as coarse-grain reconfigurable processors (CGRPs) to execute dataflow computing applications.

BACKGROUND

The present disclosure (hereinafter, "the disclosure") relates to applications such as neural networks in dataflow and data parallel computing applications in machine learning and artificial intelligence, and to computing systems for executing such applications. In particular, the disclosure relates to programming language compilers of computing systems, and to compiler optimization of allocation of hardware resources of computing systems to execute functions of such applications.

The disclosure further relates to reconfigurable processing architectures in such computing systems and, in particular, to computing systems comprising Coarse-Grained Reconfigurable (CGR) Processors (CGRPs) to process such advanced computing applications. Additionally, the disclosure relates to programming language compilers of a CGR computing system (CGRS) and allocation by a compiler of CGRS hardware resources to operations of dataflow and data parallel application programs.

BRIEF DESCRIPTION OF THE DRAWINGS

The drawings included in the present disclosure are incorporated into, and form part of, the specification. They illustrate implementations of the present disclosure (hereinafter, "the disclosure) and, along with the description, serve to explain the principles of the disclosure. The drawings are intended to be only illustrative of certain implementations and are not intended to limit the disclosure.

SUMMARY

Figure 1:
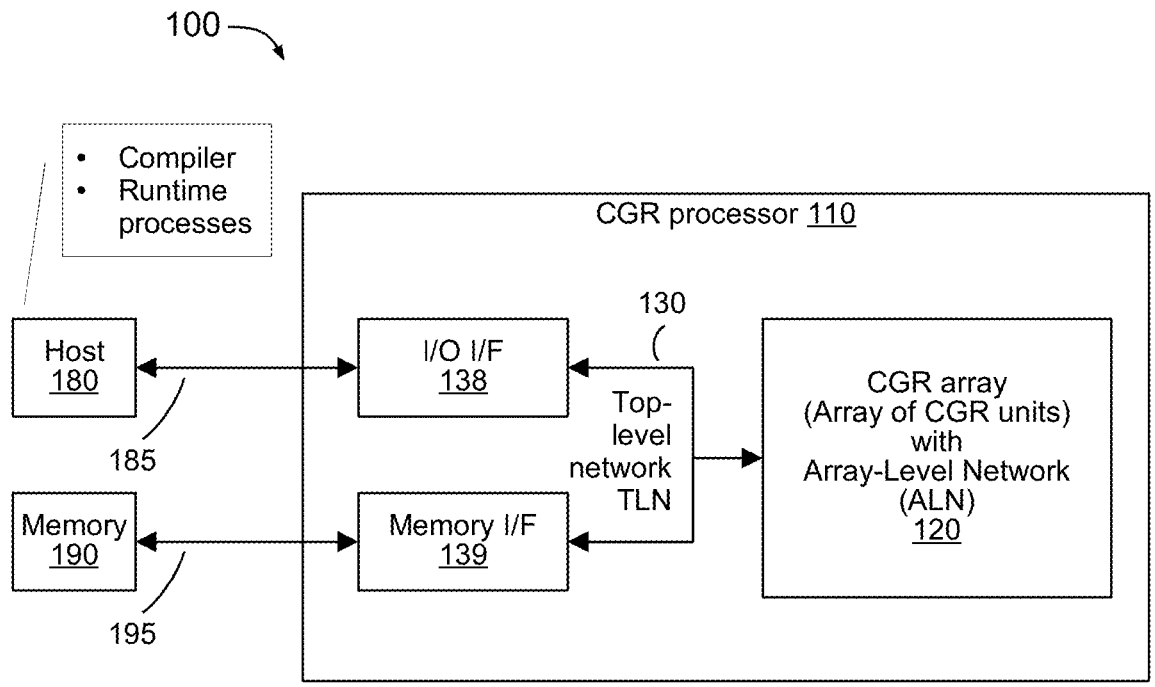
FIG. 1 illustrates an example coarse-grain reconfigurable (CGR) system (CGRS), according to aspects of the disclosure.

A method comprises a compiler performing a trial compilation of a high level decision to an LLIR (low level intermediate representation). The high level decision is among high level decisions to execute a dataflow application on a second computing system. The LLIR comprises hardware resources of the second computing system to execute the dataflow application based on the first high level decision. In the method the compiler further determines low level execution metrics associated with the hardware resources included in the LLIR and determines, based on the low level execution metrics, a trial result.

The compiler performs a trial compilation of a second high level decision, among the high level decisions, to a second LLIR. The second LLIR comprises second hardware resources of the second computing system to execute the dataflow application based on the second high level decision. The compiler further determines second low level execution metrics associated with the second hardware resources and determining, based on the second low level execution metrics, a second trial result.

In the method, the compiler evaluates the first trial result based on an execution objective and evaluates the second trial results, based on a second execution objective. Based on evaluating the first and second trial results, the compiler selects one or both of the first and second high level decisions for executing the dataflow application on the second computing system.

A computer program product and a computing system can implement the method. A compiler of the computing system, for performing the method, can include comprise a high level (HL) compiler and a low level (LL) compiler. The HL compiler can determine high level decisions to execute the dataflow application on the second computing system, and the LL compiler can perform the first and second trial compilations, and can determine the low level execution metrics and the trail results. The LL compiler can communicate the low level execution metrics and the trail results to the HL compiler and the HL compiler can select one or both of the first and second high level decisions for executing the dataflow application on the second computing system.

DETAILED DESCRIPTION

Aspects of the present disclosure (hereinafter, "the disclosure") relate to methods of compiling neural network applications for execution on computing systems utilizing reconfigurable dataflow processing elements, in particular utilizing coarse-grain reconfigurable processors (CGRPs). More particular aspects relate to determining mappings of neural network operators and data flow to CGRP processing and/or memory elements, and/or configurations of CGRP processing and/or memory elements. Implementations of the disclosure (hereinafter, "implementations") can analyze a computation graph of a machine learning application or model to determine alternative mappings.

Processing elements that implement aspects of the disclosure can include processors of data parallel (DP) and/or dataflow computing systems, such as Central Processing Unit (CPUs), Graphics Processing Units (GPUs), Field Programmable Gate Arrays (FPGAs), and Digital Signal Processors (DSPs). Certain aspects of the disclosure relate to executing neural networks on computing systems utilizing reconfigurable processor architectures, such as CGRPs, reconfigurable Application Specific Integrated Circuits (ASICs), and/or Application Specific Instruction-set Processors (ASIP).

Implementations that are not mutually exclusive are taught to be combinable. One or more features of an implementation can be combined with other implementations. The disclosure in some instances repeats references to these options. However, omission from some implementations of recitations that repeat these options should not be taken as limiting the combinations taught in the preceding sections—these recitations are hereby incorporated forward by reference into each of the following implementations.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and/or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein.

The terms "comprising", "including", and "having" can be used interchangeably herein.

Unless otherwise specified, the use of ordinal adjectives first, second, third, etc., to describe an object, merely refers to different instances or classes of the object and does not imply any ranking or sequence.

As used herein, "incorporated subject matter" refers, collectively, to subject matter disclosed, and/or otherwise encompassed, among the disclosures incorporated herein by reference. For purposes of illustrating the disclosure, but not intended to limit implementations, various terms of the disclosure are drawn from the incorporated subject matter. As used herein, unless expressly stated otherwise, such terms as can be found in the incorporated subject matter have the same meanings, herein, as their meanings in their respective incorporated disclosures.

Aspects of the disclosure can be appreciated through a discussion of example implementations and/or applications of methods and/or systems. However, such examples are for purposes of illustrating the disclosure. It should be understood that the intention is not to limit the disclosure to the example implementations described herein, but to encompass all modifications, equivalents, and alternatives falling within the spirit and scope of the disclosure. Thus, the disclosure is not intended to be limited to the implementations shown but is to be accorded the widest scope consistent with the principles and features disclosed herein. Various modifications to the disclosed examples will be readily appreciated by those of ordinary skill in the art, and the general principles defined herein can be applied to other implementations of the disclosure without departing from the spirit and scope of the disclosure.

The disclosure uses terms and acronyms related to the field of the technology, defined, at least in part, herein as:

AI—artificial intelligence.

AIR—arithmetic or algebraic intermediate representation.

ALN—array-level network.

Application Model—In machine learning applications, "application model" commonly refers to a mathematical representation of a machine learning application. An application model can comprise an application graph and/or textual (e.g., high level, intermediate level, and/or low level programming language) representation. An application model can represent a set of mathematical operators (compute functions of an application) and a flow of data between the operators, and can represent the operators and dataflow graphically and/or textually. As used herein, "application model" or, simply, "model" refers interchangeably to an application itself (e.g., high level programming statements of an application) and a graphical and/or textual representation of the application's compute functions and/or dataflow.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

CGR unit—a circuit that can be configured and reconfigured to locally store data (e.g., a memory unit or a partition memory unit, such as described in Prabhakar), or to execute a programmable function (e.g., a processor or other compute unit, or a partition compute unit such as described in Prabhakar). A CGR unit includes hardwired functionality that performs a limited number of functions used in computation graphs and dataflow graphs. Some implementations include switches to route data among CGR units.

CGR Array—an array of CGR units, coupled with each other through an array-level network (ALN), and coupled with external elements via a top-level network (TLN). In implementations a CGR array can physically implement the nodes and edges of a computation and/or dataflow graph.

CGRP—Coarse-grain reconfigurable processor. As used herein, CGRP refers to a processor, or processing element, based on a CGRA—such as an integrated circuit, chip, or module based on, or incorporating, a CGRA—and/or incorporates a CGR unit, CGR array, or elements of a CGR unit and/or a CGR array.

CGR Components—As used herein, "CGR components" refers, collectively, to hardware resources or elements of CGR units, CGR arrays, and CGRP; memories of CGR units/arrays/processors; and, networks and/or I/O interconnections and interface hardware interconnecting CGR units/arrays/processors and/or memories, such as Ethernet networks/interfaces, I/O buses/interfaces, such as PCI-Express buses, InfiniBand buses/interfaces, and/or memory or data buses/interfaces, such as buses of a processor and/or memory fabric, and related interface hardware).

CGR hardware—As used herein, the terms "CGR hardware" and "CGR hardware resources" refer to any individual hardware element, or combination of hardware elements, of CGR components of a CGRS.

CGRS—a computing system comprising CGR units and/or CGRPs. As used herein, CGRS refers to a computing system that is based on, and/or can utilize, reconfigurable computing resources, such as CGR arrays, CGR units, and/or CGRPs, to perform operations of data parallel and/or dataflow applications. U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, illustrate example implementations of CGR arrays, CGR units, CGRPs, and CGR systems.

Chip—As used herein, the term "chip" refers to an IC (or, combination of ICs) that can embody elements of a CGRA. A chip can typically be packaged in a chip module (e.g., a single chip module, "SCM" or, alternatively, a multi-chip module, "MCM").

Compiler—a translator that processes statements written in a programming language to machine language instructions for a computer processor. A compiler can include multiple stages to operate in multiple steps. Each stage can create or update an intermediate representation (IR) of the translated statements. Compiler stages are illustrated with reference to FIG. 3.

Computation graph/Graph—As used herein, computation graph refers to a type of directed graph comprising nodes and edges connecting the nodes, to represent a dataflow application. In a neural network application nodes can represent mathematical operations/expressions and edges that indicate dependencies between the operations/expressions. For example, in machine learning (ML) algorithms, input layer nodes can assign variables, output layer nodes can represent algorithm outcomes, and hidden layer nodes can perform operations on the variables. Edges can represent data (e.g., scalars, vectors, tensors) flowing between operations. In addition to dependencies, the computation graph reveals which operations and/or expressions can be executed concurrently.

Dataflow Application—As used herein, the term "dataflow" application refers interchangeably to data parallel and dataflow applications. such as ML, AI, and other massively parallel computing applications.

Dataflow Graph—a computation graph, or portion of a computation graph, corresponding to operators (application compute functions), data, and flow of data among operators, of a dataflow application that includes one or more loops of operator nodes that can be nested, and wherein nodes can send messages to nodes in earlier (predecessor) layers to control the dataflow between the layers.

IC—integrated circuit—a monolithically integrated circuit, i.e., a single semiconductor die which can be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Intermediate Representation (IR)—an Intermediate Representation is a representation of an application in an intermediate langue. An IR can incorporate partial compilation results, such as sections (groupings) of a graph or model, pipelines that can be formed within a graph or model, mappings of application functions or graph nodes/edges to hardware resources of a CGRS.

Logical CGR—A logical CGR array or logical CGR unit comprises a representation of a CGR array or a CGR unit that is physically realizable, but that may not, at a particular time in executing a dataflow application, have been assigned to a physical CGR array or to a physical CGR unit on an IC.

ML—machine learning.

PEF—processor-executable format—a file format suitable for configuring a configurable data processor.

Pipeline—a staggered flow of computational operations through a chain of pipeline stages in which the operations can be executed in parallel. In an application graph, a pipeline can comprise a set of operator nodes that can pipeline operations of the graph.

Pipeline Stages—a pipeline can be divided into stages that are coupled with one another as predecessor/successor stage to form a pipe topology.

PNR—place and route—the assignment of logical CGR units and associated processing/operations to physical CGR units in an array, and the configuration of communication paths between the physical CGR units.

RAIL—reconfigurable unit abstract intermediate language.

RP—reconfigurable processor. An RP can comprise, for example, field programmable gate arrays (FPGAs), graphic processing units (GPUs), and/or CGRPs.

TLIR—template library intermediate representation (IR).

TLN—top-level network.

Turning now to more particular aspects of the disclosure, high-level programs for machine learning (ML) and artificial intelligence (AI) can require massively parallel computations, where many parallel and interdependent computation threads (pipelines) exchange data. Such programs are ill-suited for execution on traditional, Von Neumann architecture computers. Rather, these applications can require architectures optimized for parallel and pipeline processing, such as CGRAs or graphic processing units (GPUs).

The ascent of dataflow applications such as ML and AI, and massively parallel architectures (such as CGRAs) places new and complex requirements to execute the applications, or computations of the applications, on CGR hardware. Such requirements can include how computations of an application are pipelined, which computations are assigned to which compute units, how data is routed between various compute units and memories, and how synchronization among processors, memories, and data transfer hardware is controlled, particularly when a dataflow applications includes one or more nested loops, whose execution time can varies depending on the data being processed. The architecture, configurability and dataflow capabilities of CGR systems, and CGR components of CGR systems, enable increased compute power that supports both parallel and pipelined computation.

In implementations CGR components of a CGRS, for example, can be programmed to simultaneously execute multiple independent and interdependent operations. To enable simultaneous execution within a pipeline stage, and across pipeline stages, dataflow applications need to be distilled from a high-level program and translated to low level instructions to execute the program on hardware resources of reconfigurable dataflow systems, such as a CGRS. The low level instructions can comprise a configuration file describing a configuration of CGR components, as well as processor (e.g., CGRP) instructions and/or instructions for transferring application data among CGR components.

A high-level program is source code written in programming languages like Spatial, Python, C++, and C, and can use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

In computing applications, a compiler translates high-level programs to instruction executable by processors of a computing system. In a CGRS, a CGRS compiler can translate high-level programs to processor instructions, but also to executable instruction files and/or "bit files" describing configurations of CGR components to execute a dataflow application, or pipeline stages of a dataflow application. CGRS compilers require mapping application operations and data flow to CGR hardware components in both space (CGR hardware parallelism) and time (for synchronization of interdependent computations). This requirement implies that a CGRS compiler must determine which operations of a dataflow application are assigned to which of the CGR components, and how both data and, related to the support of computation and control information flow among CGR components, and to/from external hosts and storage. This process, known as "place and route", is one of many new challenges posed to CGRS compilers.

FIG. 1 illustrates an example reconfigurable dataflow computing system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via data bus 130 which can be part of a top-level network (TLN). Host 180 communicates with IO interface 138 via system data bus 185, and memory interface 139 communicates with memory 190 via memory bus 195. Array of CGR units 120 can further include compute units and memory units that connected with an array-level network (ALN) to provide the circuitry for execution of a computation graph or a dataflow graph that can have been derived from a high-level program with user algorithms and functions. The high-level program can include a set of procedures, such as learning or inferencing in an AI or ML system. More specifically, the high-level program can include applications, graphs, application graphs, user applications, computation graphs, control flow graphs, dataflow graphs, models, deep learning applications, deep learning neural networks, programs, program images, jobs, tasks and/or any other procedures and functions that can need serial and/or parallel processing. In some implementations, execution of the graph(s) can involve using multiple units of CGR processor 110. In some implementations, CGR processor 110 can include one or more ICs. In other implementations, a single IC can span multiple CGR processors. In further implementations, CGR processor 110 can include one or more units of array of CGR units 120.

Host 180 can be, or can include, a computer such as will be further described with reference to FIG. 11. Host 180 can execute runtime processes, as further referenced herein, and can also be used to run computer programs, such as a CGRS compiler. In some implementations, the compiler can run on a computer that is similar to the computer described with reference to FIG. 11, but separate from host 180.

CGR processor 110 can accomplish computational tasks by executing a configuration file (for example, a PEF file). For the purposes of this description, a configuration file corresponds to a dataflow graph, or a translation of a dataflow graph, and can further include initialization data. A compiler compiles the high-level program to provide the configuration file. In some implementations described herein, a CGR array is configured by programming one or more configuration stores with all or parts of the configuration file. A single configuration store can be at the level of the CGR processor or the CGR array, or a CGR unit can include an individual configuration store. The configuration file can include configuration data for the CGR array and CGR units in the CGR array, and link the computation graph to the CGR array. Execution of the configuration file by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that can comprise multiple IC dies and other devices, assembled into a single module as if it were a single device. The various dies of an MCM can be mounted on a substrate, and the bare dies of the substrate are electrically coupled to the surface or to each other using for some examples, wire bonding, tape bonding or flip-chip bonding.

Many dataflow applications, such as in ML and other types of AI applications, comprise neural networks (NNs). Examples of neural networks include fully connected neural networks (FCNNs), recurrent neural networks (RNNs), graph neural networks (GNNs), convolutional neural networks (CVNNs), graph convolutional networks (GCNs), long short-term memory (LSTM) networks, autoencoders, deep belief networks, and generative adversarial networks (GANs).

In data parallel and dataflow applications, such as NNs, compute functions of the application are often referred to as "operators". The compute functions perform computations, such as matrix computations using tensor data of the application, to execute the higher level processes of the application (e.g., object recognition in an image, natural language phrase interpretations or prediction, etc.). A neural network processes data according to a flow of computational input (operand) and computational output (results) data through layers of operators (neurons) of the NN.

Operators of an input layer can receive stimuli (e.g., input data), and the input and other (e.g., "hidden") layers compute particular functions (e.g., an activation or loss function), and operators of an output layer output computational results. A particular layer of an NN comprises operators that perform the particular function computations of that layer. Example layers, and associated operators, of NNs include rectified linear unit (ReLU) layers, fully connected layers, recurrent layers, graphical network layers, long short-term memory layers, convolutional layers, kernel layers, dropout layers, and pooling layers.

A machine learning application requires "training" within a problem space the application is designed to recognize (e.g., subjects of images, audio, or video) or predict outcomes (e.g., natural language phrase completion, future values, etc.). Training a neural network can comprise determining and/or optimizing parameters associated with computations (e.g., activation functions) of the NN computed by operators within layers of the NN. Weights and biases, for example, can be parameters of a weights-bias activation function of a neural network. In training such an NN, a training (data parallel/dataflow) application can compute gradients of weights and biases, such as by using a loss-function, and can optimize the weights and biases based on an optimization algorithm such as gradient descent. Executing an ML application can utilize the optimized parameters to execute functions of the application.

Problem spaces of a machine learning application, and/or input of dataflow applications in general, can comprise enormous amounts of data, and can often comprise tensor data. Thus, functions of these applications (e.g., operators of neural networks) commonly involve linear algebra computations over tensor data, such as matrix multiplication, transposition, and addition. Algorithms commonly employed in dataflow applications include algorithms such as linear regression and gradient descent over tensors and/or matrices of tensors. Matrices of tensors data can comprise matrices of varying dimensions and a variety of computing systems, including dataflow computing systems, can perform matrix computations, such as GeMM, matrix summation, matrix transposition, gradient computations, and/or backpropagation of matrix computations, to process tensors in dataflow applications such as machine learning in neural networks.

As used herein, brackets and a capital letter, such as [M], is used to refer to a matrix as a whole, while lowercase letters, such as m, are used to refer to an element, or set of elements, of a matrix [M]. For example, an expression such as (w×a) refers, herein, to a multiplication of a set of elements of matrices [W] and [A], such as elements of a row of matrix [W] multiplied by elements of a corresponding column of matrix [A]. The term "element", in reference herein to a matrix, refers to the contents (e.g., a scalar value) of a row and column cell of the matrix.

A common computation for processing tensors in dataflow applications is a sum of products (dot product) of two matrices. The products comprise products of elements of a row of one multiplicand matrix (a "left side" matrix_multiplied by corresponding elements of a column of a second multiplicand (a "right side" matrix), where the row dimension of the left side matrix and the column dimension of the right side are the same (shared dimension.) As used herein, the term "dot product" refers to a sum of two or more products of a row of a left side matrix multiplicand by a column of a right side matrix. An expression such as (Σw a) refers to a sum-product of elements w and a (e.g., a sum of products w×a for elements of a row of a matrix [W] multiplied by elements of a column of a matrix [A]). As an example, a dot product of elements $w_{11}$ of matrix [W multiplied by au of matrix [A], and $w_{11}$ multiplied by $a_{21}$ of matrix [A], is $[w_{11} \times a_{11} + w_{11} \times a_{21}]$.

A "matrix summation" computation, as used herein, refers to a matrix computation in which a dot product of two multiplicand matrices is added to a matrix addend. A matrix addend can comprise a constant or can comprise a matrix (which can itself be multiplied by a matrix multiplied by a constant) sharing a row dimension of the dot product of two multiplicand matrices. A "weight-bias function", y=Σw a+b, is one example of such a computation, in which a weights matrix [W] is multiplied by an activation matrix [A] and the dot products, Σw a, for each row/column set of products, is added to elements of a bias matrix [B] . . . .

In implementations, a CGRP, and/or other CGR components of a CGRS, can perform computations (e.g., operators) of applications in a distributed fashion and/or can execute computations as dataflow pipelines that can efficiently exploit CGRS and application parallelism, and CGR component data locality. Dataflow pipelines of CGRS compute units (e.g., CGRPs and/or CGR arrays) can contain several computational stages, in which each stage can read data from one or more input buffers (e.g., buffers in CGR component memories), can perform computations on the data while using one or more internal buffers to store and retrieve intermediate results, can produce outputs, and can write the outputs to one or more output buffers.

Data parallel and dataflow computing applications can comprise tensor computations, usually involving enormous amounts of data, such as very large and/or numerous matrices of tensor data. For example, machine learning (ML) and other tensor-based applications can comprise a convolutional neural network (NN). While not intended to limit implementations, a convolutional neural network can serve to illustrate aspects of the disclosure. However, it will be appreciated by one of ordinary skill in the art that aspects of the disclosure can apply broadly to a variety of computing applications involving tensor data, and/or executed by data parallel and/or dataflow applications and computing systems.

An NN can comprise layers organized as a pipeline of computations using matrices of tensor data. A layer of the NN can comprise operators performing computations on matrices of tensor data. A particular operator of an NN (or, tensor-based application in general) can perform a matrix computation, such as Generalized Matrix Multiplication ("GeMM"), matrix convolution, and Rectified Linear Units ("ReLU") corresponding to particular algorithms and/or functions of the application, such as an activation function, gradient descent function, and/or a loss function. A particular layer of an NN can comprise multiple processing elements, such as CGRPs, executing in parallel to perform operator computations of the application using subsets of tensor data. The processing elements of one layer of an NN can output results of their computations to a successor "forward" and/or "backward" layer of the NN.

Various types and/or combinations of computing systems can execute tensor-based applications, and/or operators of tensor-based applications, such as NNs. Data parallel (DP) and dataflow computing systems, particularly systems utilizing CGRPs, can be particularly efficient at executing tensor-based applications. CGRPs can individually, or in combination, execute functions and/or computations of application operators, in parallel and in pipelines, to efficiently execute an application and improve performance of application execution. As used herein, the term "reconfigurable dataflow system (DS)" refers, interchangeably, to data parallel and dataflow computing systems utilizing reconfigurable processors such as CGRPs. A CGRS can, for example, efficiently execute tensor-based applications such as convolutional neural networks, and can serve to illustrate aspects of the disclosure without limiting implementations.

A tensor-based application can include "operators" that perform computations such as linear regression, non-linear regression, Gaussian regression, Support Vector Machine (SVM) regression, Generalized Linear Models, regression trees, shallow and deep neural network models, logistic regression, decision tree, and, "K" nearest neighbor, using matrices of tensor data. One expression, or representation, of an application is a computation graph (hereinafter, for brevity, simply "graph"), which can be textual, graphical, or a combination of textual and graphical descriptions of operators, operands, and results of computations of the application. A graph can represent the operators (as compute nodes of the graph) of an application, and their arrangement and/or dependencies (e.g., flow of computational inputs and outputs) among the operators (as edges of the graph).

Data nodes of a graph can represent particular application data elements, such as input data for training an ML model. A graph can be a directed acyclic graph (DAG), or can comprise loops, and even nested loops, of operators. As used herein, except where otherwise qualified as "data node", the term "node" is used herein interchangeably to refer to an operator of an application and a node representation of that operator in a graph.

Forward nodes of a graph can receive outputs of backward nodes (e.g., gradients), and backward nodes can receive updated outputs of forward nodes (e.g., outputs computed using outputs of backward nodes), creating feedback loops within the graph. As nodes within a feedback loop recompute outputs based on the feedback, such nodes are referred to herein as "recompute nodes".

A pipeline of an application can comprise a set of forward operators and, optionally, set of backward operators (e.g., backpropagation operators). Each operator within a pipeline can process data output from a predecessor operator, generally in parallel with the predecessor operators as the predecessor operator outputs results of computations over a portion input data.

Figure 2:
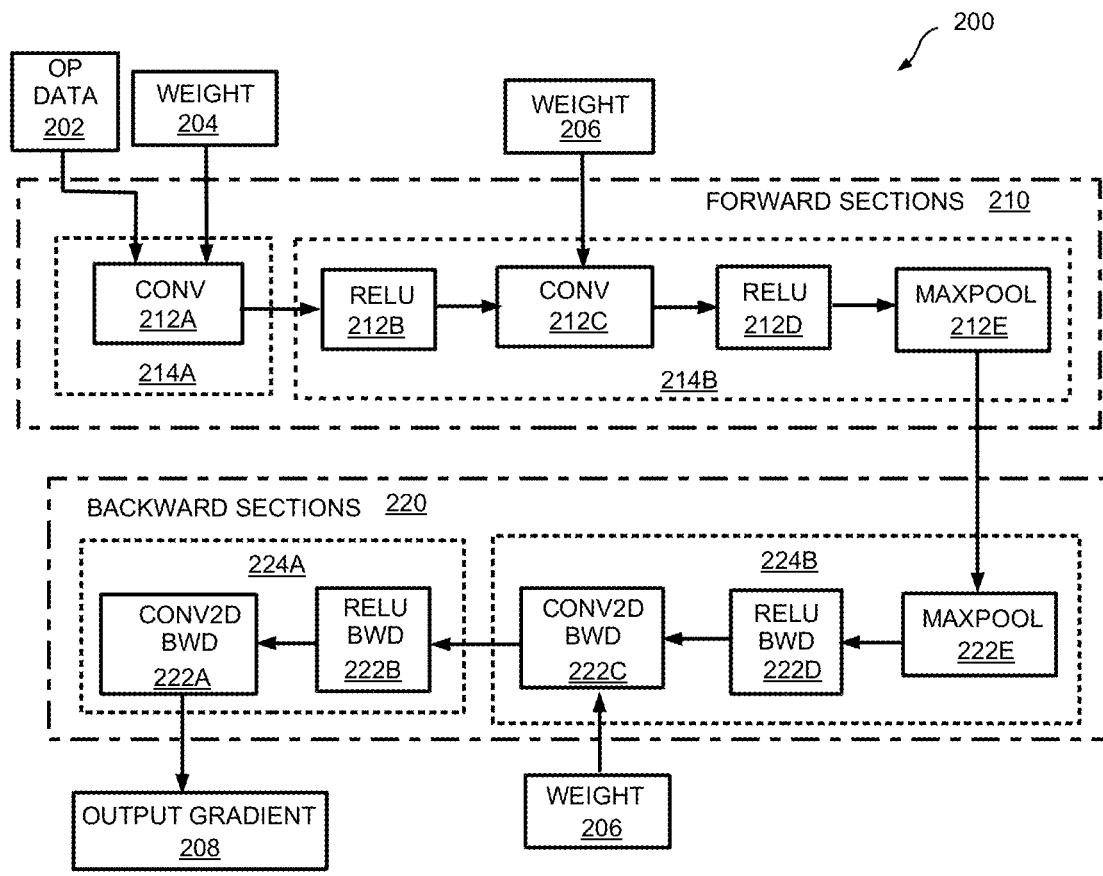
FIG. 2 illustrates an example sub-graph, according to aspects of the disclosure.

FIG. 2 illustrates an example of a computation graph corresponding to an application. As shown in FIG. 2, forward and backward operators of an application can be grouped, such as for mapping the operators to CGR components for execution, as respective forward and backward sections of a graph. The sections can each represent nodes of the graph that do not have data dependencies among each other (that is, do not need to await complete computational results of another compute node), such that a CGRS can execute computations of the nodes in a pipeline topology among CGR components. Sections can particularly comprise operators that are "adjacent" and, based on not having data dependencies among each other, can form a pipeline. A "producer" operator and a "consumer" operator are adjacent operators in a graph if the producer can input results of the producer operator computations to an operand of the consumer operator. For example, a GeMM operator is adjacent to an ADD operator if a results matrix (or elements of a results matrix) of the GeMM operator can be direct input to the ADD operator.

In FIG. 2, forward sections 210 is shown comprising Pipe 214A and Pipe 214B, and backward sections 220 is shown comprising Pipe 224A and Pipe 224B. Pipe 214A is shown comprising node CONV 212A, and Pipe 224B is shown comprising nodes RELU 212B, CONV 212C, RELU 212D, and MAXPOOL 212E (hereinafter, collectively "nodes 212). Names of nodes, such a "RELU", can indicate a type of computation of the application performed by a node.

Edges of a graph can represent data flow between and into or out of the nodes. Thus, computational results of node CONV 212A can flow as inputs to node RELU 212B, computational results of node RELU 212B can flow as inputs to node CONV 212C, and so forth. Data nodes in a graph can represent data processed by compute nodes and flow of data into or out of the nodes (as also shown in FIG. 2 by directed arrows). In forward sections 210, FIG. 2 depicts data nodes OP DATA 202 and WEIGHT 204 as data input to CONV 212A, and WEIGHT 206 as data input to CONV 212C.

In FIG. 2, backward sections 220 is shown comprising Pipe 224A and Pipe 224B, Pipe 224A is shown comprising nodes CONV2D BWD 222A and RELU BWD 222B, and Pipe 224A is shown comprising nodes CONV2D BWD 222C, RELU BWD 222D, and MAXPOOL 222E. In backward sections 220, FIG. 2 depicts data node WEIGHT 206 as data input also to CONV2D BWD 222C. Backward nodes of a graph can represent nodes that receive outputs of forward nodes and compute a feedback function over those outputs. For example, a common backward computation is to compute gradients of weights and biases, and/or loss functions based on gradients of weights and biases, in a weights-bias activation function of a forward node. Backward nodes, can compute, for example, a gradient in an application that include gradient descent to optimize computations of forward nodes in a feedback loop. As shown, an output of backward sections 220 is data node output gradient 208, output node CONV2D BWD 222A.

In implementations, a "CGRS compiler" can compile a high-level language representing of a data parallel and/or dataflow application to configurations and/or execution instructions to execute the application. For brevity, hereinafter "application" is understood to refer to a data parallel or dataflow programming application for execution by a data parallel and/or dataflow computing system, such as a CGRS.

A CGRS compiler can, for example, transform an application into, and/or can utilize, a graph such as example graph 200 in FIG. 2. Based on a graph of an application, a CGRS compiler can generate a search space, and can use the graph and/or search space to determine application operational parallelism and pipelining, and/or to map application dataflow (e.g., nodes and edges of a computation graph) to CGRS and/or CGR hardware resources and dataflow through the resources. A compiler can further transform resource mapping decisions into assembler input for generation of hardware instructions and/or hardware configuration files, such as a Processor Executable Format (PEF) file.

Figure 3:
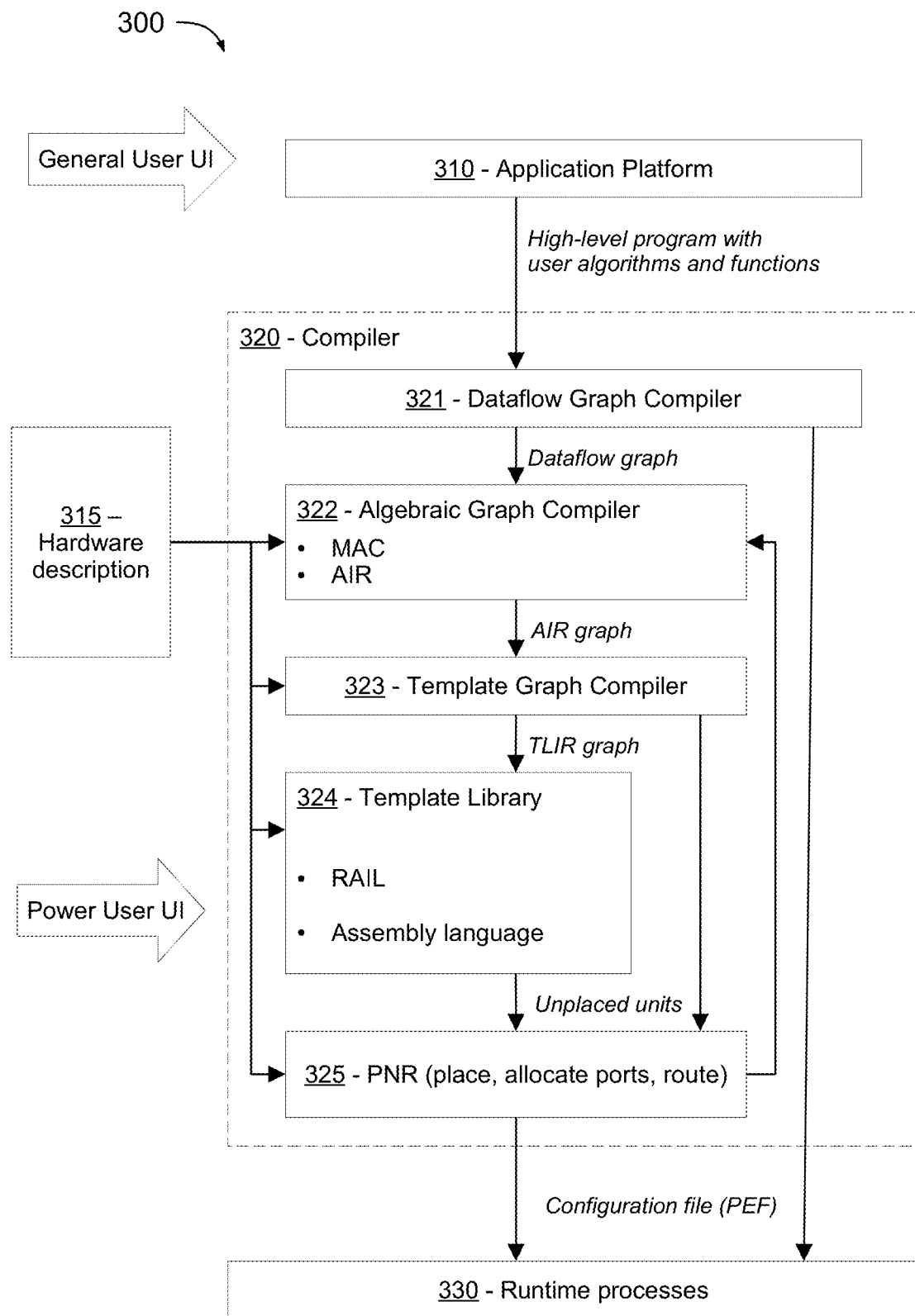
FIG. 3 illustrates an example compiler stack, according to aspects of the disclosure.

FIG. 3 is a block diagram of example compiler stack 300 comprising multiple compilation stages to compile a dataflow application for execution by a CGRS. As depicted in FIG. 3, compiler stack 300 includes several stages to translate a high-level program, with (user) dataflow application algorithms and functions (e.g., ML algorithms and/or tensor computation functions), to configuration and/or instruction data for a CGRS to execute the application.

Compiler stack 300 can take its input from application platform 310, and/or any other source of high-level program statements of an application, which provides a user interface, such as an API and/or command line interface (CLI), for application developers to compile an application. A "user", as used herein, can be any human or computing system that develops an application (e.g., programs the high-level programs of an application), and/or that can input an application into a CGRS compiler for translation to CGRS configurations and/or CGRS execution instructions.

Compiler stack 300 can further receive hardware description 315, which can comprise a textual and/or graphical description of CGRS and/or CGR hardware components of a CGRS. Compiler stack 300 can utilize hardware description 315 to translate the high-level programming statements of an application to configurations CGR components and/or execution instructions (e.g., instructions to a runtime processor to control execution, and/or processor instructions to execute functions, of an application) to execute the application.

Application platform 310 can comprise a computing system for developing an application and/or inputting an application for compilation by a CGRS compiler. For example, application platform 310 can comprise a computing system capable of hosting a user, such as host processor in the CGRS examples of Kumar. Application platform 310 can include libraries such as PyTorch, TensorFlow, ONNX, Caffe, and Keras to provide user-selected and configured algorithms.

Application platform 310 can output a high-level program of an application to compiler 320, which in turn can output a configuration file to runtime processes 330. Runtime processes 330 can comprise programs to configure CGR components, and/or manage execution of an application on CGR components, of a CGRS. The programs can execute on a runtime processor (e.g., one or more CPUs) of a CGRS.

Compiler 320 can include dataflow graph compiler 321, algebraic graph compiler 322, template graph compiler 323, template library 324, and placer and router PNR 325. In implementations, template library 324 can include a reconfigurable unit abstract intermediate language (RAIL), and/or assembly language interfaces (APIs) for power users.

Dataflow graph compiler 321 can analyze high-level programs, implementing user algorithms and application functions received from application platform 310, and can convert the high-level programs to one or more dataflow graphs. The high-level programs can be suitable for parallel and/or pipeline processing and nodes of the dataflow graphs can be intrinsically parallel unless an edge in the graph indicates a dependency. Dataflow graph compiler 321 can provide code optimization steps, such as false data dependency elimination, dead-code elimination, and numeric constant folding. The dataflow graphs can encode data and execution control dependencies of the high-level programs.

Dataflow graph compiler 321 can support programming a CGR components (e.g., CGRPs) using higher or lower-level programming languages, For example dataflow graph compiler 321 can support translation or conversion from an application platform 310 to C++ and/or an assembly language. In implementations, dataflow graph compiler 321 can allow programmers to provide code (e.g., machine language code) that runs directly on CGRPs and/or other CGR components. Dataflow graph compiler 321 can include one or more programming libraries, and the libraries can include predefined functions, such as linear algebra operations, element-wise tensor operations, non-linear functions, and reduction functions for creating, executing, and profiling dataflow graphs on the CGRPs. Via the application platform 310, dataflow graph compiler 321 can provide an API to enhance programming functionality available to application developers.

Algebraic graph compiler 322 can include an Application analyzer and Compiler (MAC) level that can make high-level mapping decisions for sub-graphs (also referred to as "sections" or "section cuts") of a dataflow graph based on CGR hardware constraints. Algebraic graph compiler 322 can support various application frontends, such as Samba, JAX, and TensorFlow/HLO. Algebraic graph compiler 322 can also transform the graphs, for example via autodiff and GradNorm, to perform stitching between sub-graphs, interface with template generators for performance and latency estimation, convert dataflow graph operations to algebraic intermediate representation (AIR) operations, perform tiling, sharding (database partitioning) and other application preparation operations, and can model or estimate execution parallelism that can be achieved within the dataflow graphs.

Algebraic graph compiler 322 can include an arithmetic or algebraic intermediate representation (AIR) level that can translates high-level dataflow graph and mapping decisions provided by a MAC level into AIR graphs. An AIR level can include validating and/or correcting ("legalizing") a dataflow graph and/or mapping decisions of a MAC; expanding data parallel, tiling, pipeline, and/or region instructions provided by a MAC; inserting stage buffers and skip buffers, eliminating redundant operations, buffers, and sections; and, optimizing resource use, execution latencies, and computational throughput.

Template graph compiler 323 can translate AIR graphs to a template library intermediate representation (TLIR). A TLIR can comprise a graph that can optimize configurations and/or execution instructions based on target (CGRS and/or CGR) hardware architecture and/or to unplaced units suitable for place, allocate, and route level PNR 325. Template graph compiler 323 can add further information node names, node inputs, node input names, and dataflow descriptions) as inputs to PNR 325, and can make the graph physically realizable through each layer of the graph. Template graph compiler 323 can, for example, translate AIR graphs to specific application operation templates, such as templates for general matrix multiplication (GeMM), matrix transposition, and/or matrix convolution operations. In implementations a CGRS compiler like compiler 320 a can convert part or all intermediate representation operations to templates, stitch templates into data and control flow of the application, insert necessary buffers and layout transforms, generate test data, and optimize for CGR hardware utilization, execution latency, and compute and/or data transfer throughput.

Implementations can use templates for common operations. Templates can be implemented using assembly language, RAIL, or similar language and/or representation constructs. RAIL can compare to a low-level language, in that memory units and compute units can be separately programmed in RAIL constructs, but RAIL can provide a higher level of abstraction and compiler intelligence that, for example, an assembly language, via a concise performance-oriented and domain-specific language for CGR component (e.g., CGR array) templates. RAIL can enable template writers and external power users to control interactions between logical compute units and memory units of CGR components using high-level expressions, without the need to manually program actions such as capacity splitting, register allocation, etc. RAIL logical compute and memory units can also enable stage/register allocation, context splitting, transpose slotting, resource virtualization and mapping to multiple physical compute units and memory units (e.g., PCUs and PMUs of tiles, such as in the examples of Grohoski and Kumar).

Template library 324 can include an assembler that provides an architecture-independent, low-level programming interface as well as optimization and code generation for CGR hardware. An assembler can include memory address expression compilation, CGR hardware intra-unit resource allocation and management, rendering a template graph physically realizable based on CGR hardware-specific rules, low-level CGR hardware architecture-specific transformations and optimizations, and CGR hardware architecture-specific code generation.

PNR 325 can translate RAIL and/or assembly language outputs of template library 324, and/or TLIR outputs from template graph compiler 323, and can map logical (e.g., unplaced physically realizable) CGR units, to physical CGR hardware implementation levels, such as an SCM, MCM, and/or chip level of CGR components, can determines physical data channels to allow for communication among the CGR units and between the CGR components (e.g., components coupled via a TLN, allocate memory, I/O, and/or switch ports of CGR components, provide CGR component configuration data and initialization data, and can produce configuration files, e.g., processor-executable format (PEF) files. PNR 325 can provide bandwidth calculations, allocate network interfaces, provide configuration data for CGR components to perform memory address translation, and control switch and data routing among CGR components. PNR 325 can perform such functions in multiple steps and can include multiple modules (not shown in FIG. 3) to perform the multiple steps, e.g., a placer, a router, a port allocator, and a PEF file generator). PNR 325 can receive input data, for example, from any of the higher-level modules (dataflow graph compiler 321, algebraic graph compiler 322, template graph compiler 323, and/or template library 324). In implementations, a higher-level module, such as template graph compiler 323, can prepare information for PNR 325 and can omit other levels directly providing input data to PNR 325.

Implementations of compiler 320 compile applications in an iterative process, such as feeding information from PNR 325 back to a higher-level module, which can, in turn, execute a new compilation step using physically realized results, rather than estimates of, or logical placeholders for, physically realizable circuits. For example, PNR 325 can feed information regarding the physically realized circuits back to algebraic graph compiler 322.

Memory allocations can represent logical memory spaces in on-chip (a chip implementing a CGR component) and/or off-chip (a chip separate from a CGR component), CGR component memories, for data flowing through the dataflow graph; a configuration file, such as a PEF, can specify particular memory allocations. Memory allocations can define a type and number of CGR hardware memories and/or circuits (functional units, storage, or connectivity components). Main memories (e.g., DRAM) can be, for example, off-chip memories, and scratchpad memories (e.g., SRAM) can be on-chip memories, such as memories of a CGR array. Memory allocations can correspond to various access patterns and/or memory layouts, such as access patterns/layout of cache memories, read-only look-up tables (LUTs), serial memories (e.g., FIFOs), and/or register files.

Compiler 320 can bind memory allocations to unplaced memory units and can bind operations of a dataflow graph to unplaced compute units, for execution of a graph, and configuration data, such as in a PEF, can specify such bindings. In implementations, compiler 320 can partition parts of a dataflow graph into memory subgraphs and compute subgraphs, and can specify these subgraphs in configuration file. A memory subgraph can comprise, for example, address calculations leading up to a memory access. A compute subgraph can comprise, for example, compute operations (compute nodes) in a parent graph. A compiler can divide a parent graph into multiple memory subgraphs and a single compute subgraph, for example. A single parent graph can produce one or more memory subgraphs, depending on how many memory accesses exist in the original graph loop body. In cases where the same memory addressing logic is shared across multiple memory accesses, a compiler can duplicate address calculations to create multiple memory subgraphs from the same parent graph.

Compiler 320 can generate configuration files with configuration data (e.g., a bit stream) for the placed positions, and for routed data and control networks. In implementations this can include the compiler assigning coordinates and communication resources of the physical CGR components by placing and routing unplaced units of CGR components with a goal to maximize compute and/or data transfer bandwidth and minimizing compute and/or data transfer latency.

An application may not itself include backward nodes and, in implementations, a CGRS compiler, such as illustrated by the example of compiler 320, can determine that an application requires backward nodes, and can generate backward nodes in a computation graph. In determining a mapping of an application to CGR hardware resources, a CGRS compiler can identify recompute nodes and can determine section boundaries among forward nodes, backward nodes, and recompute nodes within a graph.

To exploit the full power of a CGRS—particularly, dynamically reconfigurable CGR components of a CGRS—a CGRS compiler must not only generate low level processor instruction sequences, but must also allocate reconfigurable resources of the underlying CGR hardware that can execute the application most efficiently, and with highest possible computational performance. A CGRS compiler must, further, determine controls to sequence transfer in (e.g., to a memory and/or compute unit), processing (e.g., compute unit and/or operator pipelining), and/or transfer out (e.g., from a memory and/or compute unit) of application data.

In optimizing parallelization and computational latency of among CGRS hardware resources, a CGRS compiler must consider complex factors, such as: the number of available processing units (e.g., processors of CGR components); the number, size, and transfer latency of memory units (e.g., memories of CGR components); computational latency of operators of the application; dependencies among operators; and, sections of an application that can execute in parallel, not only intrinsically, but also given the amount of CGRS hardware resources available to execute the sections.

Such considerations can be referred to as "mapping factors". In implementations "mapping decision space" can comprise mapping factors. In addition, or alternative, to factors just described, the mapping factors can include parameters and/or attributes of an application and/or CGRS related to mapping factors, such as just described. Mapping factors included in a mapping decision space can include, for example, descriptions and/or attributes of CGR components; configurations and/or arrangements of data nodes, compute nodes, and interconnections of nodes (edges) of a graph and CGR components; and/or, groupings ("section cuts") of operators of a graph into particular pipelines and sections. Mapping factors of a mapping decision space can include alternative such configurations and section cuts, and can include costs (e.g., hardware utilization, compute and/or data transfer bandwidth or latency) associated with the alternatives. Mapping factors of a mapping decision space can include optimization goals (e.g., optimizing utilization over latency, or vice versa) and/or priorities of execution of particular nodes of a graph.

Figure 4A:
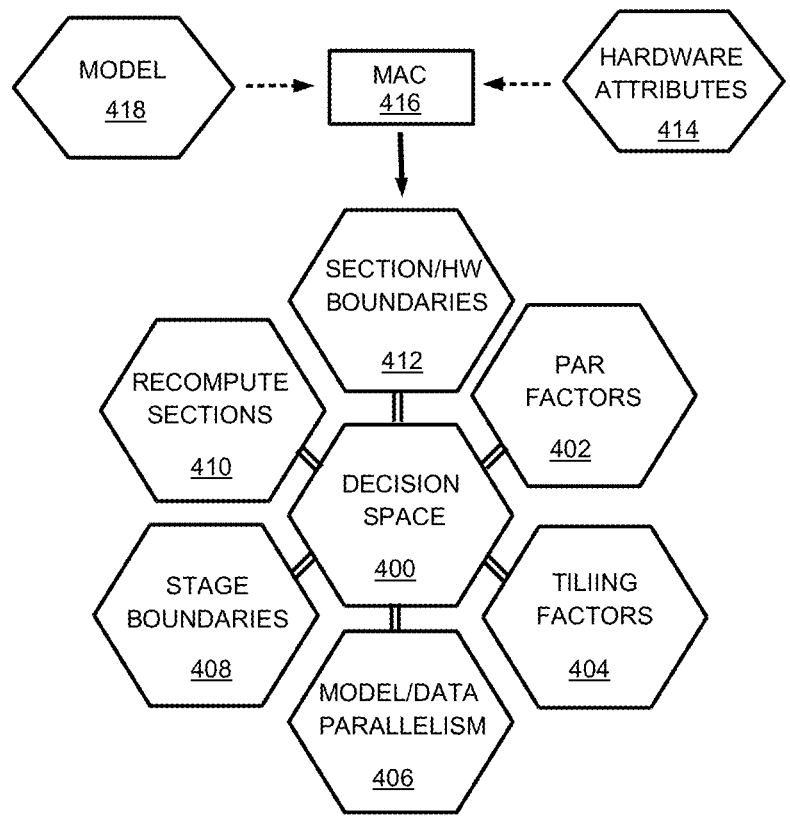
FIG. 4A illustrates an example mapping decision space, according to aspects of the disclosure.

FIG. 4A illustrates mapping factors and a mapping decision space a CGRS compiler can utilize in mapping operators and data of an application to underlying hardware resources of a CGRS (e.g., CGR components of a CGRS). A MAC component of a CGRS compiler, for example, can generate and/or analyze a computation graph of an application to determine mapping factors of a mapping decision space. For example, a MAC can traverse a graph, such as in the example of FIG. 2, to determine mapping factors of a mapping decision space.

In implementations, a compiler can determine a mapping of an application (e.g., operators and tensors included in a graph of an application) to CGR hardware resources for execution of the application. A compiler, or a MAC of a compiler, can include a hardware mapping component—referred to herein as a "mapper"—and the mapper can analyze a graph to map operators, tensors, and/or tensor dataflow of an application to CGR hardware for execution.

For purpose of illustrating the disclosure, example operations of the disclosure, such as example operations of FIG. 4A, are frequently described as performed by a MAC, and/or components of a MAC, of a CGRS compiler. However, this not intended to limit implementations and one of ordinary skill in the art will appreciate that a compiler need not necessarily comprise a CGRS compiler, a MAC of a CGRS compiler, and/or particular components (e.g., a mapper") of a compiler or a MAC to perform methods, and/or steps of methods, of the disclosure. Components of a compiler alternative to these particular components can perform methods and operations of the disclosure within the scope and spirit of the disclosure.

In FIG. 4A, decision space 400 is an example of a mapping decision space that a CGRS compiler can utilize to determine alternatives to map an application to CGR hardware for a CGRS to execute the application efficiently. Decision space 400 can represent a combination (not necessarily exhaustive) of mapping factors 402-412 (collectively, "mapping factors 400" in FIG. 4A) that a CGRS compiler can include in a mapping decision space such as example decision space 400.

In FIG. 4A, app 418 can comprise an application, and/or application model, (e.g., represented as a graph and/or textual representation) and MAC 416, in FIG. 4A, can be a MAC component of a CGRS compiler configured to compile app 418. MAC 416 can generate decision space 400 to execute app 418 on CGR hardware that can be represented by hardware attributes 414. In the example of decision space 400, mapping factors 400 are shown in FIG. 4A including PAR factors 402, tiling factors 404, model/data parallelism 406, stage boundaries 408, recompute sections 410, and section/HW boundaries 412.

PAR factors 402 can comprise, for example, parallelization ("PAR") factors included in a template (e.g., a template among template library 324 in FIG. 3) that can represent an intrinsic, or application programmer preferred, parallelization of application operators. Tiling factors 404 in decision space 400 can include alternative, and/or optimal, tiling of operator and/or pipeline input data, operand matrices, and/or operator results matrices. Tiling a graph refers to partitioning, or "slicing", operand/results matrices of tensor data input to, and output from, operators in the graph into smaller matrices ("tiles"). A MAC can tile the matrices based on, and/or to preserve, a particular, shared dimension of the matrices (e.g., a row dimension or a column dimension of the matrices). Application/data parallelism 406 can include boundaries of operator and data parallelism, which can represent, for example, a degree of parallelization of application operators and data. Stage boundaries 408 can include, for example, boundaries of pipeline stages of underlying CGR hardware and/or CGR component hardware.

As illustrated in the examples of FIG. 2, a graph of an application can comprise sections. Operators that cannot be executed in parallel (e.g., operators that cannot be included in a pipeline with another operator) cannot be included in the same section of an application. Similarly, underlying CGR hardware can have limits to the number and/or type of operators that it can perform in parallel, and/or the amount of data it can process (e.g., based on sizes of memory to buffer or store input data and/or computation outputs). Thus, section/HW boundaries 412 can include boundaries, within an application or graph of an application, between forward and backward sections of the application, and/or boundaries of CGR hardware to execute operators within particular sections of a graph. Hardware boundaries among section/HW boundaries 412 can be based on a hardware description, and/or attributes of hardware, of CGR hardware, such as can be included in hardware attributes 414.

Backward nodes can be feedback paths, in the model, to recompute nodes, and the recompute nodes can be factors of decision space 400, such as to determine dependencies among sections and operators within sections. Recompute sections 410, for example, can represent combinations of operators that recompute particular application functions, such as recomputing activation functions using results (e.g., gradient adjusted matrices) of backward section operators.

In implementations, a compiler can represent an application, and/or a graph, using high level language (HL), intermediate level (IL), and/or low level (LL) language constructs and/or statements that can represent operators, operands/results of operators, and/or interconnections of the nodes and/or allocation of CGR hardware to execute the application. HL, IL, and/or LL representations can be, or can represent, an application graph or model. HL, IL, and LL language constructs/statements can describe nodes and edges of a graph, and/or instructions for executing the graph (i.e., executing the application as represented by the graph) on CGR hardware. HL, IL, and/or LL language constructs and/or statements can include compiler generated mapping alternatives and/or decisions as to how to map the application to CGR hardware for execution.

A compiler can generate a high level graph representation ("HLR") of an application. The compiler can utilize an HLR, for example, to analyze overall execution elements of the application, and/or to determine initial alternatives for mapping operations of the application to CGR hardware, such as tiling, section cut, and/or parallelization factors in mapping the application.

A compiler can generate, for example, an IL representation (ILR) of the graph that can incorporate mapping alternatives and/or decisions. For example, a compiler can translate an HL graph into an ILR such as an AIR graph and/or a TLIR graph. A compiler can compile, or translate, an ILR to an LL representation (LLR), such as a RAIL representation, that can describe configuration and/or execution instructions to execute the application using particular CGR hardware and/or configurations. The LLR can be suitable for generating application execution code specific to the CGR hardware, such as a PEF and/or configuration files. An ILR and/or LLR can be textual and or graphical, and can be another form of an application, or subset of an application.

A compiler can analyze graphs to determine execution parameters corresponding to CGR hardware allocated to execute the application. For example, a compiler can analyze an ILR (e.g., AIR) or LLR (e.g., RAIL) to determine execution latencies, processor/memory utilizations, and various other such metrics of application execution based on an IL or LL graph that includes CGR hardware resource allocations and/or execution on CGR hardware.

Figure 4B:
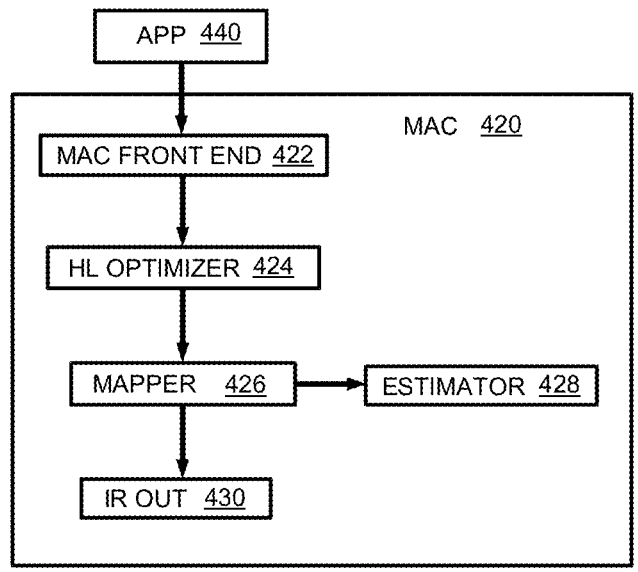
FIG. 4B illustrates an example structure of an application analyzer and compiler, according to aspects of the disclosure.

FIG. 4B illustrates example MAC 420, which can provide functions of a MAC such as MAC 416 in FIG. 4A. FIG. 4B depicts MAC 420 comprising MAC front end 422, HL optimizer 424, mapper 426, IR out 430, and estimator 428. In implementations, MAC front end 422 can comprise, for example, an API to input an application and/or application programming statements to compile for execution by a CGRS, shown in FIG. 4B as app 440. MAC front end 422 can comprise interfaces and/or functions to access hardware descriptions of the CGRS, to access or interact with other components of a compiler that includes MAC 420, and/or to access or interact with components of a host processor and/or the CGRS. MAC front end 422 can convert an application or application, such as app 440, to a graph and/or an intermediate representation (IR), for MAC 420 to determine mapping decisions to execute app 440.

HL optimizer 424 can perform high level optimization of app 440 and/or a graph of app 440, such as fusing operators (nodes) of a graph into higher level operators, eliminating no-ops and/or redundancies within app 440, and/or compute derivatives (e.g., Autodiff). In implementations, a compiler can determine a mapping of an application (e.g., operators and tensors included in a graph of an application) to CGR hardware resources for execution of the application. Mapper 426 can be a mapper component or function of MAC 420 that can determine mapping decisions to include in a mapping decision space, such as tiling, section cut, and/or parallelization decisions for mapping app 440 to CGR hardware for executing app 440.

Mapper 426 can utilize estimator 428 to determine, for example, model execution metrics such as computational latencies of CGRPs executing operators of app 440, data transfer latencies among memories of CGR hardware (e.g., memories of CGRPs executing operators of app 440), computational throughput among CGRPs executing operators of app 440, and/or amounts of memory required for operands/results tensor data of operators of app 440. Mapper 426 can output mapping decisions to IR out 430 and IR out 430 can translate, or otherwise convert, the mapping decisions to an intermediate representation of app 440 that includes mapping decisions to execute app 440 on the CGR hardware.

Figure 5:
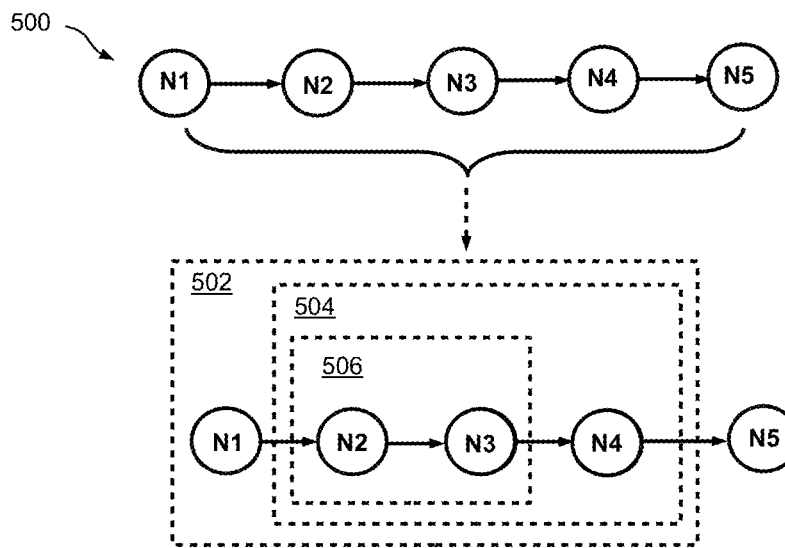
FIG. 5 illustrates an example graph comprising pipelines, according to aspects of the disclosure.

As pipelining operations of a dataflow application is an essential aspect of executing the application on CGR hardware, FIG. 5 illustrates an example portion of a graph that can form pipelines among operators in the graph. In FIG. 5, graph 500 is shown comprising operator nodes N1, N2, N3, N4, and N5 connected by directed edges shown as arrows from one node to another in FIG. 5. If an output tensor of one operator in a graph can share a dimension with an input tensor of another operator that takes the output tensor data, the two operators can potentially form a pipeline based on that shared dimension.

FIG. 5 illustrates example pipelines of nodes N1-N5 based on shared dimensions of the nodes' input and output tensors. A compiler can analyze a graph to identify dimensions on which successive operators of the graph can parallelize their computations in a pipeline. The compiler can, for example, associate dimensions of input/output tensors with a dimension name (or, "Named DIM") as a means to identify tensor dimensions for determining shared dimensions. Tensors having dimensions with the same Named DIM can potentially form pipelines based on the shared dimension corresponding to that Named DIM.

In FIG. 5, suppose that all of nodes N1-N4 have input and output tensors having multiple (e.g., 3) dimensions. Where a dimension of an output tensor of one node and a dimension of an input tensor of another (successor) node share the same Named DIM (that is, share on dimension, among the dimensions of their respective input/output tensors) the nodes (operators) can perform computations in parallel to form a pipeline. In FIG. 5, pipeline 502 represents a pipeline comprising nodes N1-N4, but not N5. In this example, nodes N1-N4 can form pipeline 502 based on a shared dimension (e.g., a dimension having the same Named DIM, say DIM "A") among the dimensions of their respective output/input tensors. However, in this example N5 can have input tensors that do not share DIM A, or any other dimension, with tensors of node N4, such that N5 cannot be included in pipeline 502 or any pipeline based on DIM A.

Nodes of a pipeline can form nested pipelines (pipelines within another pipeline) based on different dimensions among their output/input tensors. As illustrated by the example of FIG. 5, pipeline 502 can comprise nested pipeline 504, and pipeline 504 can comprise nested pipeline 506. Each of pipelines 502, 504, and 506 can be pipelines based on shared tensor dimensions different from that of other pipelines. For example, while pipeline 502 can be a pipeline formed based on shared dimension DIM A, pipeline 504 can be a pipeline formed based on DIM "B", which can be shared among tensors of nodes N2, N3, and N4 but not tensors of nodes N1 and N5. Pipeline 506 is shown comprising nodes N2 and N3, which can be a pipeline formed on dimension DIM "C" shared among tensors of nodes N2 and N3 but not shared by tensors of nodes N1 and N4.

While not shown in the example of graph 500, a node can output tensors to multiple other nodes of the graph (e.g., graph 500 can be a subgraph of a larger application graph that includes operator nodes in addition to those shown in graph 500, and nodes of graph 500 can output tensors to those additional nodes. Thus, nodes among nodes N1-N4 can output tensors to other operators not shown explicitly in graph 500; further, nodes N1-N4 can be included in pipelines based on shared dimensions of tensors of those other nodes.

A "scope" of a pipeline can correspond to the set of operator nodes that can form the pipeline. For example, in FIG. 5 pipeline 502 has a scope comprising operator nodes N1-N4, pipeline 504 has a scope comprising operator nodes N2-N4, and pipeline 506 has a scope comprising operator nodes N2 and N3. However, as a node can be included in only one pipeline at any time for executing the operators in a pipeline, two pipelines cannot have the same scope to execute the operators.

In implementations, a MAC can analyze an application (e.g., a graph of the model) to determine mapping factors included a mapping decision space, such as mapping factors in decision space 400 of FIG. 4A. A MAC can analyze an application or graph to determine operators that can form pipelines, and alternative pipelines, and associated sections including the pipelines, and can include the pipelines in a decision space (e.g., among section and HW boundaries 412 of decision space 400 in FIG. 4).

Based on mapping factors of a mapping decision space, a CGRS compiler can determine alternative configurations of nodes of a graph, such as alternative pipelines and/or sections of a graph. Based on the decisions, among other mapping factors in a mapping decision space, a CGRS compiler can determine alternative mappings of the graph to CGR hardware to execute the application.

To determine mapping alternatives, and/or mapping decisions, a mapper can make multiple passes (analyses) over a graph of an application model. For example, a mapper can make a tiling pass over the graph to partition input (operand) and output (results) tensors of each operator into smaller segments (tiles and/or slices); a sectioning pass to group operators into sections of the graph; and/or a parallelization pass to determine parallelization alternatives of differing tiling and/or sectioning alternative, and their associated PAR factors. degrees of parallelization (parallelization factors) associated with the section and tiling decisions. As a result of each pass over the graph, the mapper can generate an auxiliary graph, and/or modify an input graph, that can reflect tiling and/or sectioning alternatives and/or decisions. Subsequent passes can utilize the auxiliary graph as an input and can modify an input and/or auxiliary graph based on results of those passes.

Typically, a dataflow application program is written in a high level application programming language, such as Python, that can represent application constructs, such as operator functions, operator operands/results, operator topologies, and dataflow through the operators. However, an application language generally seeks to be hardware independent and, thus, does not represent underlying hardware constructs, such as CGR hardware resources.

Consequently, a CGRS compiler can generate an application graph or IR of the application that can express CGR system and hardware structures and/or dataflow, and relationships between application program constructs/algorithms and CGR hardware to execute the application program.

A CGRS compiler can translate an application program to a high level representation (HLR) for purposes of determining mapping decisions such as tiling and sectioning, and corresponding high level resource allocation and scheduling decisions. A compiler can analyze an application to determine CGR hardware mapping alternatives and/or elect mapping decisions, such as tiling and/or sectioning of operators, to allocate CGR hardware resources to execute the application, and/or schedule execution of operators on CGR hardware.

As previously described, an application can be represented as an HLR (e.g., a graph), and can utilize HLR constructs and syntax to describe an application. However, an HLR can require further transformation (compilation) to a low level intermediate representation (LLIR) that can express a mapping of the application to particular CGR hardware resources and data flow among these resources. LL constructs and/or syntax (of an LLIR) can represent attributes of CGR hardware such as processor throughput, pipeline stage latencies, memory capacity and/or bandwidth, memory latencies, and/or other performance and/or structural attributes of CGR hardware that can be allocated to an application during execution. An LLIR can closely represent particular CGR hardware resources and dataflow through the resources (e.g., flow through processors, memories, pipeline stages, and/or intermediate memory buffers) as operators of an application execute on the CGR hardware.

Figure 6:
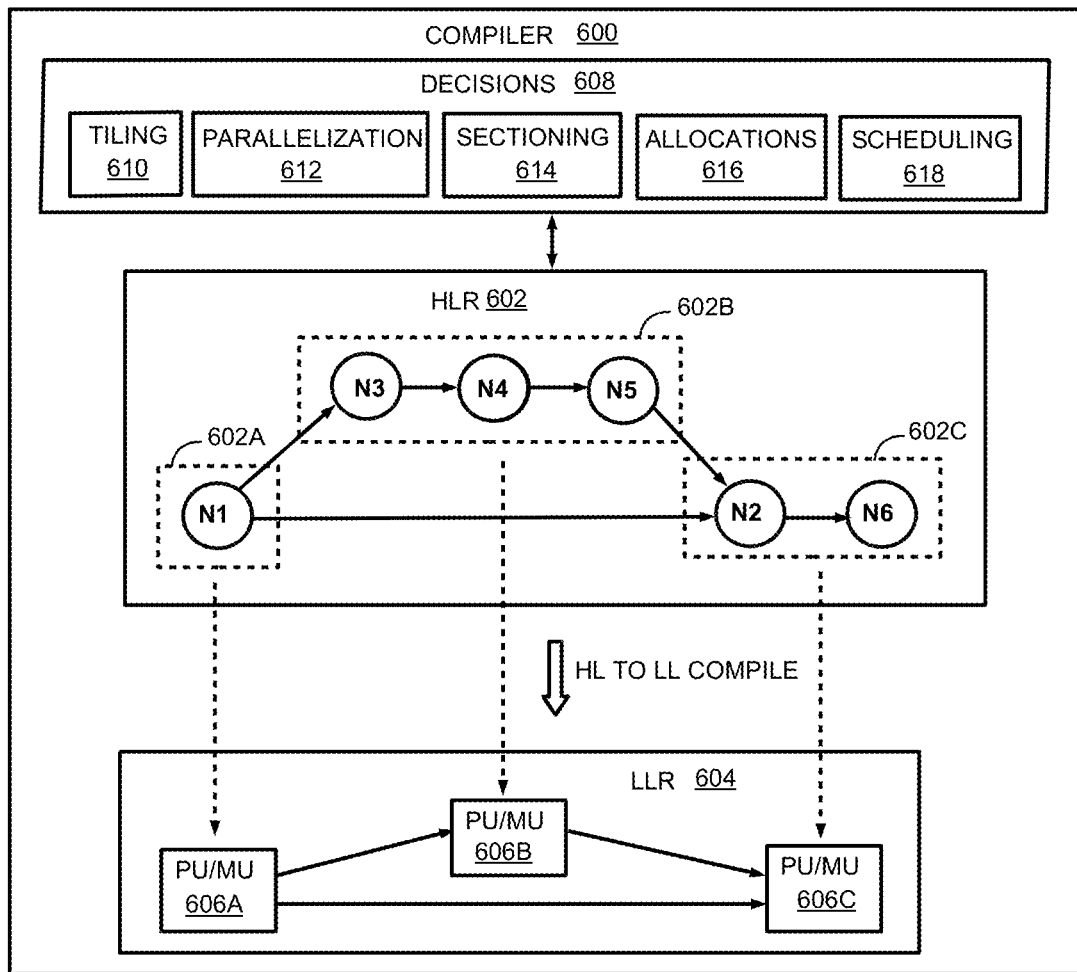
FIG. 6 illustrates an example compiler, according to aspects of the disclosure.

FIG. 6 illustrate an example dataflow compilation process, from an HLR of an application to an LLIR comprising particular hardware resources and associated attributes. In FIG. 6, example compiler 600 comprises HLR 602, decisions 608, and LLIR 604. HLR 602 as is shown in FIG. 6 as an application graph representing operators, operands/results, and/or dataflow of an application (not shown in FIG. 6). In implementations compiler 600 can comprise a compiler such as compiler 320 in FIG. 3.

HLR 602 is shown in FIG. 6 comprising operator nodes N1-N6 (collectively, "nodes 602") of the application connected in a particular dataflow topology originating with producer node N1 and culminating with consumer node N6. Compiler 600 can generate HLR 602 (or, an alternative HLR) from an application or an alternative application model, or can receive HLR 602 as an input.

Compiler 600 can analyze HLR 602 to determine mapping decisions, CGR hardware resource allocation decisions, and/or application execution scheduling decisions (e.g., alternative decisions and/or elected alternatives), illustrated in FIG. 6 as decisions 608. Decisions 608 is shown in FIG. 6 including tiling 610, parallelization 612, sectioning 614, allocations 616, and scheduling 618. Tiling 610 can include, for example, tiling decisions, and/or alternative decisions, to partition operands and/or results tensors of nodes among nodes 602. Sectioning 614 can include, for example, sectioning decisions, and/or alternative decisions, to group nodes 602. Parallelization 612 can include, for example, parallelizing decisions, and/or alternative decisions, to increase execution parallelism among operations of nodes among nodes 602. While not shown explicitly in FIG. 6, in implementations compiler 600 can include a MAC, such as MAC 420 in FIG. 4B, and the MAC can determine decisions among decisions 608.

Based on particular decisions among decisions 608 compiler 600 can determine, for example, that nodes N3, N4, and N5 can form a pipeline (or, pipelines) and compiler 600 can group nodes N3, N4, and N5 in section cut 602B. Based on other decisions among decisions 608 compiler 600 can determine that nodes N2 and N6 can form a pipeline and can group nodes N2 and N6 in section cut 602C, However, based on those, and/or other decisions among decisions 608, compiler 600 may determine that node N1 is not able to form a pipeline with either node N3 or node N6, such that based on these decisions compiler 600 can determine to include node N1 by itself in section cut 602A.

Among decisions 608 determined by compiler 600, allocations 616 can include, for example, CGR hardware resource allocation decisions, and/or alternative decisions, to execute operations of nodes among nodes 602 based on other decisions, or decision alternatives, such as among tiling 610, parallelization 612, and/or sectioning 614. Scheduling 618 can include, for example, decisions, and/or alternative decisions, to schedule execution of nodes among nodes 602 on CGR hardware resources included in allocations 616.

Allocations 616 can comprise high level representations of CGR hardware resources. In translating an HLR to an LLIR, a CGRS compiler can map, or allocate, particular instances of CGR hardware to higher level abstractions of those resources, such as resources that can be included in allocations 616 or other mapping/execution decisions such as illustrated by decisions 608. To illustrate such a mapping, FIG. 6 shows LLIR 604 comprising processing/memory units PU/MU 606A, PU/MU 606B and PU/MU 606C (collectively, "PU/MUs 606"). PU/MU 606A, PU/MU 606B and PU/MU 606C can comprise, for example, processor and/or memory units of a CGRP allocated to execute nodes among nodes 602 and/or mapped from corresponding section cuts of HLR 602 (e.g., sectioning 614). While not shown explicitly in FIG. 6, LLIR and/or PU/MUs 606 can include, for example, configurations, identities, operating characteristics, and/or attributes of corresponding CGR hardware resources that can be used to evaluate performance effects of the mappings of HLR 602 to CGR hardware as shown in the example of FIG. 6.

Typical programming language compilers (e.g., for general purpose, or even special purpose, computers/processors) translate high level language program statements to a low level program (e.g., assembler or machine language). However, as can be seen from the example of FIG. 6, a CGRS compiler can compile an application to an HLR (e.g., a graph and/or text utilizing HL constructs/syntax) and/or can analyze an HLR to determine high level mapping/allocation/execution decisions (hereinafter, "high level decisions"). A CGRS compiler can further compile an HLR to an LLIR that can represent execution aspects of particular CGR hardware unit allocation and execution scheduling. As illustrated in the example of FIG. 6 compiler 600 can generate LLIR 604 to incorporate aspects of high level decisions among decisions 608 in lower level graphical or language constructs representing particular CGR hardware resources, such as among PU/MUs 606.

It is also common for typical programming language compilers, and even other compilers for dataflow applications, to translate high level language program statements to low level processor instructions and/or execution instructions in a single compilation. However, a CGRS compiler can determine many alternative mapping decisions to execute a given application model, such as represented by HLR 602. For example, compiler 600 can potentially partition HLR 602 into many alternative tiles and sections, and can determine potentially many corresponding hardware resource mapping and allocation alternatives. Particular high level application execution decisions, such as illustrated by the example of decisions 608, can perform much differently from each other when compiled for execution to an LLIR.

As just described, however, an HLR may not represent, or well represent, low level attributes of CGR hardware allocated to an application, such that the effects of high level decisions can be evaluated only after compilation of the HLR to an LLIR. In some cases it may not be possible to know that high level decisions expressed in an HLR are actually feasible to execute the application model. For example, it may not be possible to determine from an HLR that particular high level decisions can fit on CGR hardware allocated or available to execute the application, or that the high level decisions can execute the application within particular execution objectives, such as execution runtime and/or CGR hardware utilization. Some high level decision alternatives, determined based on an HLR, can perform better, while others can perform much worse, when evaluated after compilation of an HLR to an LLIR.

Thus, there can be a cyclic dependency between components, or component levels, of a CGRS compiler, in which evaluating application execution effects of high level compilation decisions depend on compilation to an LLIR or other low level expression. Accordingly, it can be advantageous for a CGRS compiler to evaluate alternative high level decisions, based on an HLR, with respect to effects visible in an LLIR result of compiling the HLR, and to determine which decision alternatives can improve application execution performance and/or achieve particular application execution objectives.

To evaluate effects of alternative high level decisions, an "iterative intermediate" compiler can perform "trial" compilations of high level decisions, based on an HLR, to an LLIR. Based on the LLIR of those decisions, the compiler can evaluate how particular high level decisions affect, or how well the decisions achieve, particular application execution objectives in light of CGR hardware that can execute the application. For example, based on an LLIR compilation from an HLR, an iterative intermediate compiler can assess effects of particular high level decisions on a number, size, and/or type of CGR hardware resources (e.g., processors and/or memories) required to execute the application. An iterative intermediate compiler can assess effects of particular high level decisions in achieving an application execution objective, such as application execution latency, CGR hardware utilizations, and/or allocation of particular CGR hardware resources to execute an application.

To improve determine alternative high level decisions, and/or to elect more optimal decisions, an iterative intermediate compiler can feed back, to high level decision components of the compiler (e.g., a MAC or mapper), results of evaluating effects of high level decisions in an LLIR compilation output. The compiler can determine additional or alternative high level decisions, and can include these decisions in the HLR (e.g., modify HLR mapping, allocation, and/or scheduling decisions), based on feedback from trial LLIR compilations.

Figure 7:
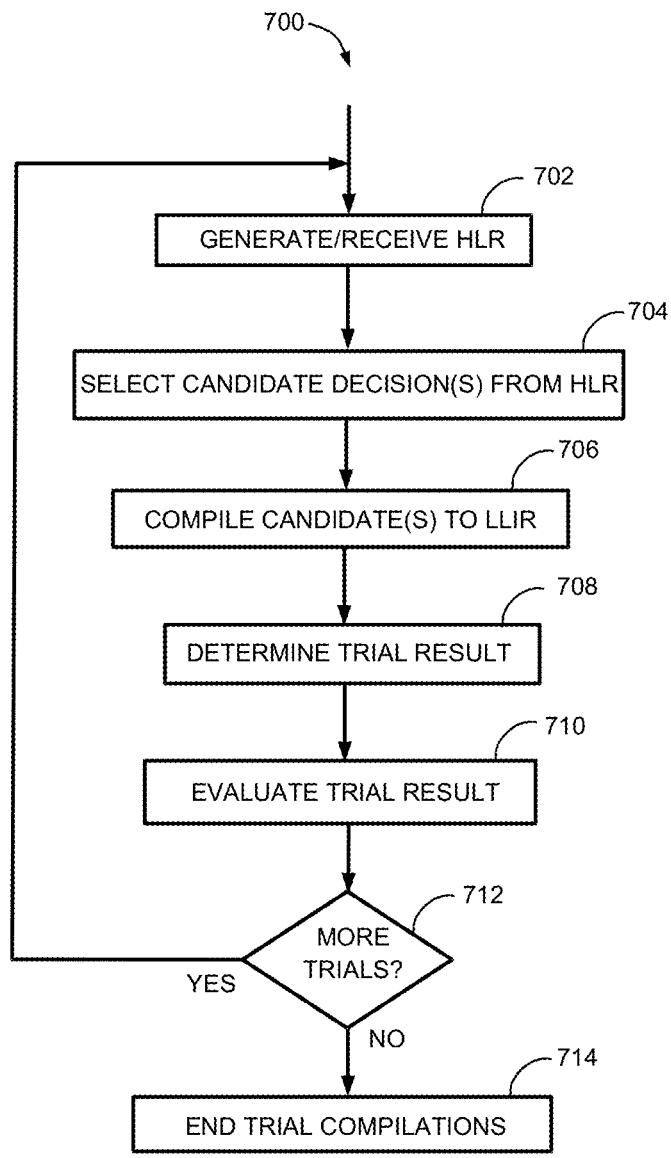
FIG. 7 illustrates an example method to try alternative compilations, according to aspects of the disclosure.

FIG. 7 illustrates example method 700 for a compiler to perform an iterative compilation of an application to determine and incorporate high level decisions in an HLR of the application; compile elements of the HLR to an LLIR; use the LLIR to evaluate low level execution effects of high level decisions included in the HLR; and, using the low level evaluation results, determine alternative high level decisions. For purposes of illustrating the method, but not intended to limit implementations, method 700 is described as performed by an iterative intermediate type of CGRS compiler (with reference to FIG. 7, "the compiler"). Also to illustrate the method, the compiler is considered to include a high level (HL) compiler (e.g., a MAC, such illustrated by MAC 420 in FIG. 4B) and a low level (LL) compiler that can compile an HLR to an LLIR (e.g., transform AIR constructs and/or statements to RAIL constructs and/or statements).

However, this is not intended to limit implementations and one of ordinary skill in the art will appreciate that method 700, and/or steps of method 700 or equivalents of steps of method 700, can be performed by any type of compiler, or components of a compiler, suitable to compile a dataflow application for execution by a dataflow computing system.

Turning to FIG. 7, in step 702 of method 700 the compiler generates or receives an HLR of an application. In Step 702 the compiler can generate the HLR from an application, such as a graph, or can receive an HLR generated previously (e.g., in a previous step or prior compilation of the application). As previously described, a mapping component of a compiler (e.g., a MAC component of the compiler) can determine high level mapping decisions to execute the application, such as such as illustrated in the example of decisions 608 in FIG. 6, to execute the application on CGR hardware. Additionally, or alternatively, in step 702 the compiler (e.g., MAC of the compiler) can determine high level decisions to execute the application on CGR hardware. The HLR can include, or be associated with such high level decisions. For example, an HLR can comprise an AIR representation, and a MAC can transform mapping decisions to AIR constructs and/or statements. An AIR can include or represent mapping decisions and/or CGR hardware scheduling and parallelism decisions.

Initially, in step 702, the compiler can receive or determine initial high level decisions for all of an HLR or for only a subset of the HLR. In subsequent iterations that repeat step 702, the compiler can determine or receive alternative high level decisions for the HLR, or for a portion of the HLR, such as for a particular section, or set of sections, of the HLR.

In step 704, the compiler selects one or more candidate high level decisions (hereinafter, with reference to method 700, "candidate decisions") from among mapping decisions to execute the application. The compiler can select, in step 704, all high level mapping decisions included in, or associated with, an HLR or, alternatively, can select one or more particular high level decisions, to compile to a low level representation. In step 704, an HL compiler of the compiler, for example, can select the candidate decisions.

Candidate decisions can correspond to, or be represented within, a section cut of an application, such as illustrated in the examples of sections 602A, 602B, and 602C in FIG. 6. A particular section cut can, for example, incorporate particular computations of the application (e.g., operator nodes in a graph), operand/results tiling, hardware allocation, parallelization of operators/computations of an application, and/or hardware execution high level decisions. Thus, in step 704, in selecting candidate decisions the compiler can select one or more section cuts of the HLR for trial compilation to an LLIR and evaluation of the candidate decisions to execute the application on CGR hardware. In the example of method 700, it will be appreciated by one of ordinary skill in the art that the compiler can trial compile a complete HLR, one or more section cuts of an HLR, and/or particular high level decisions.

In step 706, the LL compiler initiates a trial compilation of the candidate decision(s), selected in step 704. Compiling the candidate decisions, in step 706, can include transforming the candidate decisions from the HLR (e.g., representations of operators, section cuts, and/or high level decisions in an AIR) to LLIR constructs, such as RAIL constructs and/or statements, corresponding to execution of the application on particular CGR hardware. Transforming the candidate decision to an LLIR can include transforming the candidate decisions to low level (e.g., RAIL) allocations of particular CGR hardware resources and/or execution scheduling of the CGR hardware resources. Transforming the candidate decisions to an LLIR, in step 706, can determine, for example, a number and/or configuration of processors (e.g., CGRPs) and/or memories, and/or sizes of memories, to allocate for executing the candidate decisions. Scheduling decisions included in an LLIR can include, for example, scheduling execution of particular CGRPs to compute particular functions of the application, and/or scheduling transfer of application data and/or computational results among CGRS memories and/or CGRPs.

Compiling the candidate decisions to an LLIR, in step 706, can determine whether particular computations of nodes in a section cut can be performed in parallel, can be pipelined, or must be staged, based on particular CGR hardware resources represented in the LLIR for executing the candidate decisions. Compiling the candidate decisions to an LLIR, in step 706, can determine memory and processor requirements to execute the section and, based on the memory required and potentially underutilized processors, the compiler can determine whether particular node computations should be recomputed versus checkpointed in a memory.

In step 708, the compiler evaluates the LLIR (e.g., CGR hardware resources, and/or configurations of CHR hardware resources, of the LLIR to execute the candidate decisions) to determine a trial result. A trial result can comprise an indication of whether or not the candidate decisions achieve a particular optimization criterion or application execution objective. A trial result can comprise, or be based upon, low level execution metrics (LL metrics) corresponding to the LLIR resulting from the trial compilation in step 706.

The compiler can, in step 708, compute, or otherwise determine (e.g., from a specification or description of the CGR hardware) low level execution metrics corresponding to the LLIR, such as corresponding to RAIL allocations and/or scheduling of CGR hardware in an LLIR. LL execution metrics can include, for example, a number of processors (e.g., CGRPs) to execute the candidate decisions (e.g., a section cut included in the candidate decisions); an amount of memory used to execute the candidate decisions; a number of parallel computations to execute a section cut; processor latencies to execute the candidate decisions; and/or a utilization of CGR hardware processors to execute the candidate decisions. LL execution metrics can include, for example, a number of stage buffers required to execute the candidate decisions; a size of one or more memories to allocate to execute a section cut; memory transfer latencies to execute the candidate decisions; and/or a utilization of memories, or particular memories (e.g., on-chip and/or off-chip memory) to execute the candidate decisions.

In step 708 the LL compiler (for example) can determine a trial result and can output (feedback) the trial result to, for example, the HL compiler. In step 710 the HL compiler can evaluate the trial result to determine if the candidate decisions achieves an application execution objective. An execution objective can include, for example, a target (objective) hardware utilization, a target memory utilization, a target level of execution parallelism, and/or a target execution latency. An execution objective can include, increasing or, alternatively, decreasing utilization of particular CGR hardware, such as particular processors and/or memories. An execution objective can include increasing parallelism among CGR hardware executing the application, and/or among operators of the application. An execution objective can include decreasing execution latency of the application, or of particular computations of the application, or decreasing a number of stage buffers and/or transfers of data among stage buffer and/or memories, in executing the application.

Evaluating the trial result in step 710, can include determining how closely the trial compilation of the candidate decisions achieves or, alternatively, by how much a trial compilation of the candidate decisions fails to achieve, a particular execution objective (e.g., a comparative number of processors to allocate, a comparative amount of memory utilized, or a comparative execution latency, associated with the candidate decisions).

An execution objective can include, or can be associated with, for example, threshold values of corresponding LL execution metrics. A threshold value can comprise, for example, a value that, if exceeded (or, alternatively, not exceeded) by an LL execution metric, can indicate that an associated high level decision (or, decisions) is/are (or, alternatively, is/are not) optimal to execute the application. An LL execution metric can have an upper and lower threshold value, such that the LL execution metric being within (or, alternatively, being not within) a range of values between the upper and lower threshold values can indicate that the candidate decisions achieve or, alternatively, do not achieve an execution objective.

In step 710 the HL compiler can compare the trial result from step 708 to trial results from trial compilations of other high level decisions included in an HLR. If a trial result for the candidate decisions compares more favorably to an execution objective than a trial result of an alternative high level decision, the HL compiler can determine to implement the candidate decisions for executing the application. For example, if the trial result from step 708 increases a number of processors, or reduces and amount of memory used or execution latency, to execute the application, in step 710 the HL compiler can determine to implement the candidate decisions in lieu of one or more alternative high level decisions.

Based on the trial result from step 708, the HL compiler can determine alternative high level decisions to execute the application. An alternative high level decision can comprise a new high level decision not previously included in the high level decisions, and/or can comprise a modification of the candidate decisions selected in step 704. For example, if the trial result from step 708 does not achieve an application objective, the HL compiler can determine one or more alternative mapping decisions that may, potentially, compare more favorably to (e.g., improve a mapping decision in comparison to) the execution objective. The HL compiler can include the alternative mapping decisions in mapping decisions for additional trial compilations and/or selected by the compiler or an application developer (e.g., in step 714), to execute the application.

In step 712, the compiler determines whether or not to perform additional trial compilations. In step 712 the compiler can determine to perform additional trial compilations, for example, based on the trial result from step 708, for the candidate decisions, not meeting an execution objective, and/or based on the HLR including additional high level decisions to evaluate by trial compilation (e.g., the HLR including additional high level decisions determined by the HL compiler based on the trial result from step 708).

Alternatively, in step 712, the 712 the compiler can determine to not perform additional trial compilations, for example, based on the trial result determined in step 708 meeting an execution objective, or that there are no additional high level decisions to evaluate. In step 712 the compiler can determine to not perform additional trial compilations, for example, based on a limit to trial compilation execution time or resources to perform trial compilations.

If the compiler determines in step 712 to perform additional trial compilations, the compiler can repeat steps 702-712. Alternatively, if the compiler determines, in step 712 to end trial compilations, in step 714 the compiler ends the trial compilations. In step 714 ending the trial compilations can include the compiler selecting one or more of the candidate decisions compiled and evaluated, in steps 704-708, to execute the application.

In step 714 the compiler can output trial results determined in step 708, and/or associated high level decisions, to a developer of the application (e.g., in a file of mapping decisions and/or trial compilation results). Based on the trial results output, developer can select from among the high level decisions to execute the application (e.g., include directives to the compiler for compiling the application based on the selected high level decisions).

In ending the trial compilations in step 714, the compiler can output and/or store trial results determined in step 708, and/or high level decisions selected by the compiler to execute the application. For example, the compiler can output and/or store LLIRs produced by trial compilation in step 706, trial results determined in step 708, and/or compiler metrics corresponding to the compiler performing the trial compilations (e.g., runtimes, computational resource consumption, etc. associated with one or more steps of method 700. The compiler can output the metrics and/or results to, and/or store the metrics and/or results in, a memory and/or a storage medium, device, or subsystem. In step 714 the compiler can output the metrics and/or results to a network and/or another computer or computing system communicatively coupled to the computer or computing system executing the compiler.

Figure 8:
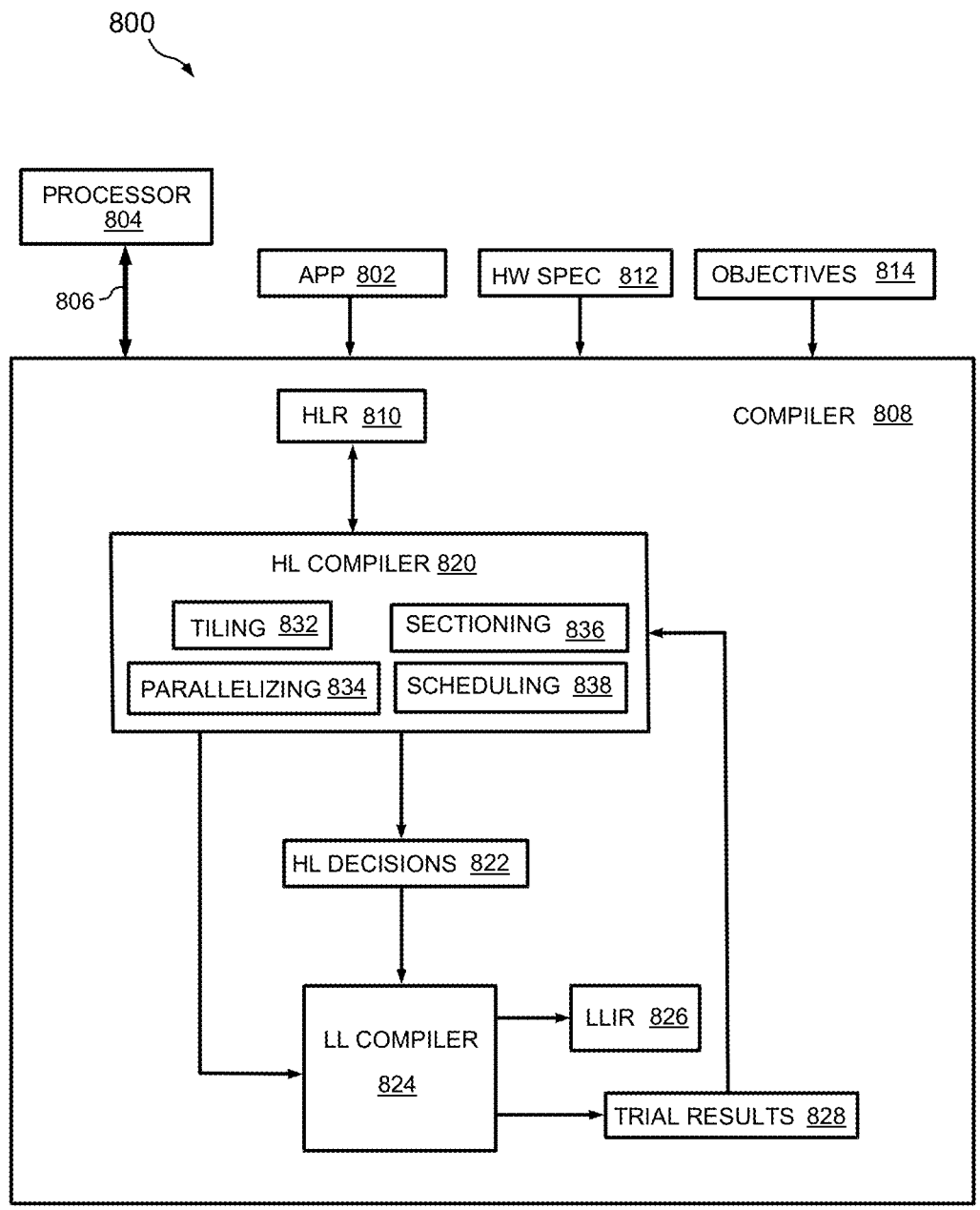
FIG. 8 illustrates an example system for performing trial compilations of a dataflow application, and/or operations thereof, according to aspects of the disclosure.

FIG. 8 illustrates an example system for performing iterative trial compilations of an application program to execute on a dataflow system. Example computing system 800 can perform a method similar or equivalent to method 700, of FIG. 7, and/or operations thereof. In FIG. 8, computing system 800 is shown comprising APP 802, processor 804, and compiler 808. In implementations, APP 802 can be any form of application for execution by a dataflow computing system, such as dataflow and data parallel applications previously described.

In implementations, compiler 808 can comprise an iterative intermediate compiler and can include programs and/or logic circuits to compile APP 802 for execution by a dataflow computing system, such as a CGRS. Compiler 808 can compile APP 802 to execute, for example, on CGR hardware of a CGRS. Compiler 808 can, for example, generate an HLR based on APP 802, shown in FIG. 8 as HLR 810, or can receive HLR 810 as an input. HLR 810 can comprise, for example, a graph and/or HL statements describing computational operators and/or functions and/or operands/results of APP 802. HLR 810 can describe a topology of operators, and/or dataflow among the operators, of APP 802. HLR 810 can comprise AIR constructs and/or statements, for example.

Processor 804 can comprise a processor, or processors, of a computing system that can execute programs of a compiler such as compiler 808. Processor 804 can comprise any type of computing processor, or combination of processors, capable of executing programs of a compiler. Compiler 808 is shown coupled to processor 804 by means of interface 806, which can comprise any type of hardware and/or software interface to execute programs of compiler 808 on processor 804. In implementations interface 806 can be, for example, an API for executing compiler 808 on processor 804, for compiler 808 to receive input data, such as application APP 802 and/or HW SPEC 812, and/or for compiler 808 to output data, such as an IR, of APP 802, high level decisions to execute APP 802, and/or results of trial compilations of APP 802 or portions of APP 802. Interface 806 can include functions, programs, and/or interfaces of an operating system (not shown in FIG. 8) of computing system 800 and the operating system can facilitate or control execution of programs of compiler 808.

Compiler 808 can include a high level compilation component, shown in FIG. 8 as HL compiler 820. HL compiler 820 can comprise, for example, an algebraic graph compiler, such as algebraic graph compiler 322 in FIG. 3, or a MAC component or function of compiler 808, such as MAC 420 in FIG. 4B. HL compiler 820 is shown in FIG. 8 comprising high level decision components (or, functions) tiling 832, parallelizing 834, sectioning 836, and scheduling 838, which can individually and/or in combination determine high level decisions to execute APP 802 on a dataflow computing system, or elements of APP 802 (nodes and/or operand/results tensors of a graph of APP 802), to CGR hardware to execute APP 802. In FIG. 8, HL decisions 822 can be an output of HL compiler 820 (and/or high level decision components of HL compiler 820), such and can include high level decisions such as high level decisions illustrated by decisions 608 of FIG. 6 to execute APP 802.

Compiler 808 can include, receive, or can have access to (e.g., in a memory or an input file), a CGR hardware description, shown in FIG. 8 as HW SPEC 812. HW SPEC 812 can include a detailed specification of hardware of a computing system (e.g., CGR hardware of a CGRS) for executing APP 802. HW SPEC 812 can include a description of hardware configurations and/or availability of particular hardware (e.g., processors and/or memories) to execute APP 802. HL compiler 820 can utilize HLR 810 and HW SPEC 812 to determine high level mapping decisions, among HL decisions 822, to execute APP 802 on hardware described in HW SPEC 812.

Compiler 808 can include a low level compilation component and/or function, shown in FIG. 8 as LL compiler 824. LL compiler 824 can comprise a component and/or function of compiler 808 that can use hardware specifications in HW SPEC 812, and high level decisions included in HL decisions 822, to compile HLR 810 to an LLIR, shown in FIG. 8 as LLIR 826. LLIR 826 can comprise any form of low level representation such as previously described. In particular, LLIR 826 can include constructs and/or language statements representing or corresponding to particular hardware included in HW SPEC 812 and/or representing or corresponding to execution flow of APP 802 (e.g., a dataflow, pipeline, and/or parallel execution of operations of APP 802). LLIR 826 can comprise RAIL constructs and/or statements, for example.

Compiler 808 can perform trial compilations, such as illustrated in the example of method 700 of FIG. 7, of HLR 810 and decisions among HL decisions 822. HL compiler can perform operations of steps 702 and/or 704 of example method 700 in FIG. 7 to determine high level decisions in HL decisions 822. LL compiler 824 can, for example, perform operations of step 706 of example method 700 in FIG. 7 to compile HLR 810 and HL decisions 822 to LLIR 826. LL compiler 824 can perform trial compilations of all of HLR 810 utilizing alternative decisions among HL decisions 822. LL compiler 824 can perform trial compilations of all elements of HLR 810 utilizing alternative or particular decisions among HL decisions 822. Additionally, or alternatively, LL compiler 824 can perform trial compilations of subsets of elements of HLR 810 (e.g., as illustrated in the example of method 700 in FIG. 7, a trial compilation of a section of HLR 810) utilizing alternative or particular decisions among HL decisions 822.

LL compiler 824 (or, a compilation evaluation component of Compiler 808 or LL compiler 824, not shown explicitly in FIG. 8) can evaluate results of a trial compilation of HLR 810 and decisions among HL decisions 822. For example, LL compiler 824 can perform operations of step 708 of example method 700 in FIG. 7 to evaluate results of a trial compilation of HLR 810 and decisions among HL decisions 822. FIG. 8 illustrates computing system 800 including objectives 814, which can comprise application execution objectives, such as previously described in reference to method 700 of FIG. 7. Objectives 814 can correspond, for example, to LL execution metrics and/or threshold values of LL execution metrics. To evaluate results of a trial compilation, LL compiler can determine LL execution metrics resulting from a trial compilation and can compare the execution metrics to execution objectives included in objectives 814.

LL compiler 824 can output results of a trial compilation, and/or evaluation results of a trial compilation, to trial results 828. HL compiler 820 can receive (e.g., from LL compiler 824), or can otherwise access (e.g., in a memory or file of a storage medium), trial results 828 corresponding to a trial compilation by LL compiler 824 of some or all of HLR 810 and some or all of decisions among HL decisions 822.

HL compiler 820 can evaluate results of trial compilations, performed by LL compiler 824, to determine and/or select (or, alternatively, discard) decisions among HL decisions 822 to execute APP 802, and/or to determine alternative high level decisions among HL decisions 822. HL compiler 820 can, for example, perform operations of step 714 of method 700, in FIG. 7, to select or, alternatively, to discard decisions among HL decisions 822 to execute APP 802, and/or to determine alternative high level decisions among HL decisions 822.

In combination, HL compiler 820 and LL compiler 824 can iteratively compile alternative high level decisions, and/or elements of HLR 810, to map operations of APP 802 to hardware of a computing system to execute APP 802, such as CGR hardware of a CGRS to execute APP 802. HL compiler 820 and LL compiler 824 can perform such iterative, trial compilations and evaluations of trial results to determine more, and/or less, optimal mappings (e.g., decisions among HL decisions 822) of APP 802 to hardware to execute APP 802.

Compiler 808, HL compiler 820, and LL compiler 824 can comprise software elements (programs), hardware elements (e.g., special purpose compilation and/or graph processors or circuits), or a combination of software and hardware elements. While not shown explicitly in FIG. 8, computing system 800 can include memories, storage media (, and/or network interfaces. Programming instructions for Compiler 808, HL compiler 820, and/or LL compiler 824 to perform methods and/or operations of the disclosure, can be stored in a storage medium and/or memory included in (but, not shown explicitly in FIG. 8), or communicatively coupled to, computing system 800, and/or accessible to processor 804.

In implementations, a storage medium can comprise any form of persistent memory or medium, such as a disk or optical storage device, or a storage medium of a computer storage subsystem. A memory can comprise any computer memory that can be accessible to compiler 808, and/or processor 804 while executing programs of compiler 808. For example, while not shown explicitly in FIG. 8, computing system 800 can include a main memory, on-chip and/or off-chip memories of a CGRS, cache memories, and/or memories of a CGRS (e.g., PMUs, DRAMs, and/or SRAMs). Network interfaces can include programs and/or hardware of, or to access, a network, such as an Ethernet network and/or the Internet.

Compiler 808 can access input information (e.g., APP 802, HLR 810 HW SPEC 812, and/or objectives 814) in the memories, storage media, and/or via the network interfaces. Interface 806, for example, can include software (e.g., APIs and/or command line interfaces) and/or hardware interfaces (e.g., buses, I/O links, and/or network interfaces) to enable compiler 808 and/or processor 804 to access the memories, storage media, and/or a network. Compiler 808 can store outputs of Compiler 808 (e.g., HLR 810 and/or modifications to HLR 810, HL decisions 822, LLIR 826, and/or trial results 828) the memories, storage media, and/or via the network interfaces. The memories, storage media, and/or network interfaces can store or provide access to programs of Compiler 808.

The example of FIG. 8 is intended only to illustrate example components, and arrangements thereof, of a system capable of performing iterative compilations of an HLR corresponding to an application model. However, the examples of FIG. 8 are not intended to limit implementations. It would be apparent to one of ordinary skill in the art that such a system can comprise a variety of components, and/or arrangements of components, alternative to the example of FIG. 8, that such alternative components/arrangements can perform iterative compilation methods and/or operations of the disclosure, and that such alternative implementations will be within the scope and spirit of the disclosure.

As previously described, a dataflow application program is normally written in a high level application language, such as Python, that generally seeks to be hardware independent and, Consequently, a dataflow application program can have hardware execution inefficiencies, such as low level operator (dataflow computation) program inefficiencies, operator and/or hardware pipeline imbalances, "memory stalls", transient overheads, unused hardware resources, and/or underutilized hardware resources. thus, does not represent underlying hardware constructs, such as CGR hardware resources.

Low-level programs (LLPs) can comprise low level processor and/or CGR hardware configuration/execution instructions to implement operators of an application. LLPs can comprise, for example, templates such as described in reference to the examples of FIG. 3. A CGRP (e.g., a PCU) can be programmed to execute a particular LPP. Operators in an application can form nested pipelines and CGR hardware can be configured (e.g., by programming switches of a compute grid, such as a PCU/PMU array) to execute a set of LLPs in parallel as a pipeline.

Pipeline imbalances refer to differing execution latencies between CGRPs executing LLPs of differing operators in a pipeline, in which one stage (e.g., one PCU, or set of PCUs) of a pipeline takes longer or less time than a producer and/or consumer stage, such that some stages may have to suspend processing pending completion of a longer executing stage. Imbalances can result based on tiling alternatives, section cuts, and/or PAR factors associated with section cuts.

Memory stalls refer to circumstances in which a CGRP's memory cannot operate at the same speed (e.g., frequency/bandwidth/data rate) as the processor's computational speed. This can cause a processor to stall (suspend processing) to await completion of memory accesses. Memory stalls can depend on a type of memory used by an OPP, such as on-chip (local to the processor) versus off-chip (remote from the processor as implemented in a different IC). Memory stalls can depend on a type or technology of memory (e.g., SRAM, register stack, or DRAM) used in executing an LLP and/or an LLP or processors pipeline.

Transient effects refers to events that can occur only once, or intermittently, in execution of LLPs in a pipeline. Transients effects can be associated with, for example: pipeline startup (internal to processors, as well as among processors executing operator pipelines of the application; programming reconfigurable CGR hardware (e.g., an RDU) to execute a particular OPP; memory initialization (e.g., fetching initial operands); memory-memory transfers between LLPs and/or internal pipeline stages of a processor; CGRA execution dependencies on, or interactions with, dataflow system operating and/or runtime systems (e.g., receiving input/communicating output from CGRA execution to OS programs, device drivers, runtime execution management, etc.); and/or transients effects that can be determined from steady-state operations of application execution.

Application inefficiencies can correspond to an "operator inefficiency". Operator inefficiencies can depend on CGR hardware design and function/implementation of LLPs and/or pipelines to execute each operator in CGR hardware. For example, operator inefficiencies can correspond to operator and/or CGR hardware pipeline initialization (warmup) and cooldown (terminating the pipeline); draining (completing remaining) processor computations and/or, inefficiencies in low level programming of LLPs, and/or sequences of LLPs. One operator inefficiency metric that can indicate operator inefficiencies, for example, can be a difference between actual execution latency of an operator (or, a set of operators, such as a meta-pipe) and a theoretical minimum execution latency (sometimes referred to as a "roofline" latency).

Such inherent application program inefficiencies in CGR hardware utilization and/or throughput can lead to suboptimal performance in executing the application on a dataflow system, especially a reconfigurable data flow system such as CGRA based systems. Thus, an application developer (e.g., a dataflow application programmer, or an automated dataflow application generator program or system) can benefit from an analysis of the application that can identify potential underlying hardware utilization inefficiencies associated with the application program.

In implementations, a dataflow computing system, such as a CGRS, can include a "application analyzer" that can analyze a dataflow application to predict CGR hardware utilization and, based on the predictions, can identify potential inefficiencies in execution on particular CGR hardware. The analyzer can organize potential inefficiencies by categories, such as in categories corresponding to the inefficiencies just described. The categories can indicate, for example, a time-average of sources of underutilized CGR hardware resources during application (or, partial application) execution, and/or other inefficiencies. The analyzer can output the categories in various formats for an application developer to utilize as a means to revise the application to reduce, and/or eliminate, inefficiencies of the application relative to the CGR hardware.

For each category of inefficiencies, the analyzer can determine corresponding inefficiency metrics, such as a total of computational cycles (e.g., FLOPs) wasted (e.g., idle or suspended instruction cycles) due to an inefficiency, and/or category of inefficiency (e.g., an aggregate total of all wasted cycles within a particular category); and/or, a total number of unused processors multiplied by the amount of time for the processors are unused, which can represent a fraction of total program peak cycle rate (FLOPs), or a fraction of total execution latency.

Figure 9:
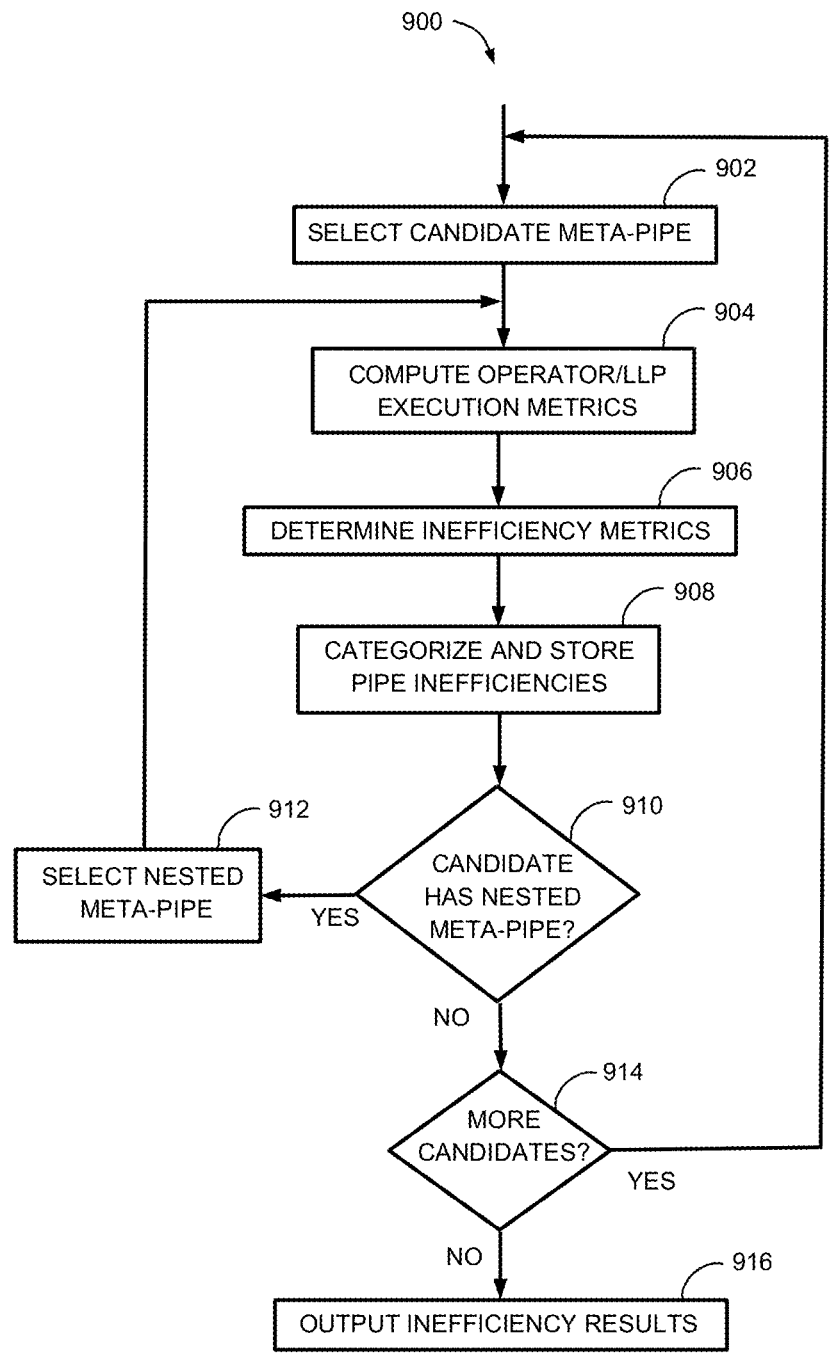
FIG. 9 illustrates an example method to determine efficiency of mapping decisions, according to aspects of the disclosure.

FIG. 9 illustrates an example method, 900, to predict hardware utilization during execution of an application program and, based on the predictions, identify and output application program execution inefficiencies such as just described. For purposes only of illustrating the method, but not intended to limit implementations, the method is described as performed by an application analyzer (in further reference, to method 900 "the analyzer"). In implementations, the analyzer can be a standalone component of a dataflow systems, and/or can be included in, or integrated with, a dataflow compiler.

An analyzer can evaluate an HLR and/or LLIR of an application program to predict CGR hardware utilization and/or identify potential execution inefficiencies and method 900 is further described as the analyzer analyzing one or both of an HLR and LLIR. The terms "an IR" and, "the IR", for purposes of describing method 900, refer interchangeably to an HLR (e.g., a graph), a LLIR, and a combination of both. Additionally, "meta-pipe" is used in the description of method 900 to refer interchangeably to a pipeline as a whole (which can be a subset of an application graph), and to a nested pipeline within a larger pipeline, or within larger meta-pipe. However, this is also for only purposes of illustrating the disclosure and not intended to limit implementations.

In step 902 the analyzer selects, from an IR, a candidate meta-pipe to analyze for potential application inefficiencies. A meta-pipe can represent a mapping of operators/operands/results and dataflow of the application to CGR hardware. However, this is not intended to limit implementations, and in alternative implementations the analyzer can select for example, in step 902, a set of operators of an application program, as represented in the IR, other than a meta-pipe, and can perform other steps and/or operations of method 900 using this alternative set of operators. The IR can include (or, be accompanied by) mapping decisions, made by compiler (e.g., an HL compiler) to map the application to CGR hardware for execution. The mapping decisions can be included in a decision space or search space of the compiler, and/or can be included in an HL and/or LL representation of a compilation operation.

In step 904, the analyzer computes operator and/or associated LLP execution metrics corresponding to the CGR hardware. The analyzer can compute the execution metrics based on mapping decisions of an HLR to CGR hardware, and/or hardware design specifications.

In step 906, based on the results of 904, the analyzer determines inefficiency metrics corresponding to the execution metrics. In 906 the analyzer can determine inefficiency metrics such as previously described. In 906 the analyzer can predict execution parameters, based on execution characteristics of the CGR hardware (e.g., the hardware mapped to the meta-pipe to execute the meta-pipe operators) to determine the inefficiency metrics.

In step 908 the analyzer categorizes and records the inefficiencies determined in step 906. The analyzer can record, for each category, the individual metrics, an aggregate of all metrics in a category, and/or a combination of these. The analyzer can record the inefficiencies in a memory, and/or a storage device, and/or can record inefficiencies in a data structure of a file or in memory, for example. The analyzer can include the inefficiencies in a decision space, search space, and HL and/or LL representations of the application model, such as an intermediate representation of the application model. The analyzer can include the inefficiency categories, metrics, and/or aggregate metrics as attributes of operators of the application model.

In step 910 the analyzer determines if the candidate meta-pipe, selected in step 902, has one or more nested meta-pipes (inner meta-pipes) that have not been evaluated. If so, in step 912 the analyzer selects a nested meta-pipe of the candidate meta-pipe and repeats 904-910 with the selected nested meta-pipe as a new candidate meta-pipe.

If, in step 912, the analyzer determines that the candidate meta-pipe, selected in step 902, does not have nested meta-pipes, in step 914 the analyzer determines if there are other, parent meta-pipes to analyze. If so, the analyzer repeats 902-914 to select and evaluate a new parent meta-pipe. If, in step 912, the analyzer determines that there are no parent meta-pipes to analyze, in step 916, the analyzer outputs the results of the inefficiency analysis.

In 916, the compiler can output inefficiency categories, metrics, and/or aggregate metrics determined by the method. The output can include suggestions and/or recommendations to modify the application model, and/or mapping decisions, to improve on, or eliminate, inefficiencies included in the results. The output can comprise tabular data and/or graphical data, or can be organized within a data structure and/or database. In 916, the analyzer can output the inefficiency results to an API of the compiler, or of the dataflow system. The analyzer can output the inefficiency results to a memory and/or a storage system.

In Step 916, the analyzer can output the inefficiency results. In implementations an analyzer can output the results, or otherwise make the results available (e.g., in a file for later use), to an "analysis assistant". In implementations an analysis assistant can assist an application developer of the program in receiving and/or interpreting the inefficiency results, and/or in revising the application program in light of the inefficiency results. An analysis assistant can be, for example, a programming component of the compiler and/or CGRS (or, a computing system coupled to the analyzer, compiler, and/or RDS).

Figure 10:
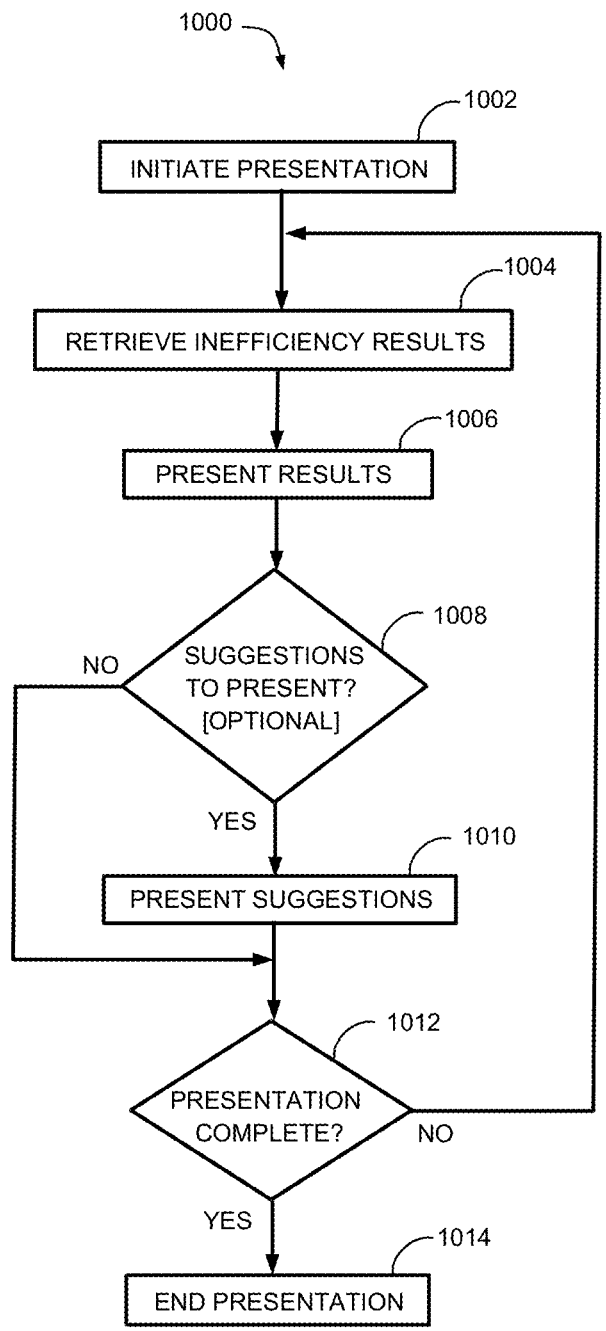
FIG. 10 illustrates an example method to present mapping suggestions, according to aspects of the disclosure.

FIG. 10 illustrates example method 1000 that an analysis assistant can perform to present inefficiency results of an analyzer to an application developer and assist the developer in interpreting the results and/or revising the application program. For purposes of only illustrating the method, but not intended to limit implementations, the method is described as performed by an analysis assistant ("the assistant", in further reference to method 900) component of a CGRS. In implementations such an assistant can be a component of a dataflow compiler of a CGRS and/or can be communicatively coupled to a computing system, memory, and/or storage medium, having a record of inefficiency results of an analyzer. In the description of method 1000, "the results" refers to inefficiency results of an analyzer, such as results output in step 916 of method 900 in FIG. 9.

In step 1002 the assistant initiates a presentation of the results. In step 1002, the assistant can initiate the presentation in response to a request (e.g., an API or CLI) of an application developer ("the developer") to present the results and/or assist the developer in observing, interpretation, and/or acting on the results to revise a corresponding application program. In step 1002, the assistant can initiate the presentation in response to receiving the results as output from the analyzer (e.g., in response to receiving the results from the analyzer performing step 916 of method 900).

In implementations, an application developer can be a human programmer of an application, but can additionally, or alternatively, comprise an automated system, such as another computing application functioning to develop the application program. Thus an application developer can be a human programmer, a computing system designed to program and/or revise dataflow applications, or a combination of a human and a computing system for developing/revising a dataflow program.

In step 1004 the assistant retrieves the results. In step 1004 the assistant can retrieve the results from, for example, an analyzer, such as output from step 916 of method 900. The assistant can retrieve the results from a memory, from a storage device, and/or via a communication or network interface.

In step 1006 the assistant presents the results to the developer. In step 1006 the assistant can present the results to, and/or interact with, the developer using, for example, an internet connection, a display of a computing system (e.g., a graphical display), and/or other computing system input/output devices (e.g., audio, video, and/or communications interface devices). In step 1002 the assistant can present the results to, and/or interact with, the developer via a communication or network interface. The assistant can present the results in a tabular form and/or graphical form. The assistant can present the results as compared to optimal, or peak, potential of application execution.

In step 1008 the assistant, optionally, determines if there are suggestions to improve inefficiencies of the application program to present to the developer. In step 1008 the assistant can determine that there are suggestions based on the analyzer having generated suggestions, and/or based on comparing the inefficiencies to optimal or peak potential of application execution. The suggestions can correspond to inefficiencies associated with particular operators (e.g., particular LLPs) and/or particular CGR hardware. The assistant can, determine, in step 1008, that there are suggestion in response to the developer requesting suggestions (which can be suggestions for improving all inefficiencies or for improving only a subset of inefficiencies).

If, in step 1008 the assistant determines that there are suggestions to present, in step 1010 the developer presents the suggestions. The assistant can repeat steps 1008 and 1010 to present a series of suggestions, and/or to interact over the suggestions. Alternatively, if the assistant determines in step 1008 that there are suggestions to present, or opts to not perform step 1008, in step 1012 the assistant determines if the presentation is complete. In step 1012 the assistant can determine that the presentation is completed based on having, for example, presented all results and/or suggestions, or a subset of the results and/or suggestions. In step 1012 the assistant can determine that the presentation is complete based on an indication, or request, by the developer to end the presentation.

If the assistant determines, in step 1012, that the presentation is not complete, the assistant can repeat steps 1004-1012. In repeating steps 1004-1012 the assistant can retrieve, in step 1004, additional or alternative results, and/or can retrieve the results previously selected in step 1004. Alternatively, f the assistant determines, in step 1012, that the presentation is complete, in step 1014 the assistant ends the presentation.

In step 1014, in ending the presentation, the assistant can store information associated with the presentation, such as the inefficiency results, suggestions, and/or results of interactions with the developer. The assistant can store the information in a memory and/or a storage device, and/or can communicate the information to a compiler, analyzer, and/or another component of a CGRS. In step 1012, in ending the presentation the assistant can initiate the analyzer repeating the analysis of the previous, or an alternative (e.g., a revised) application model.

Figure 11:
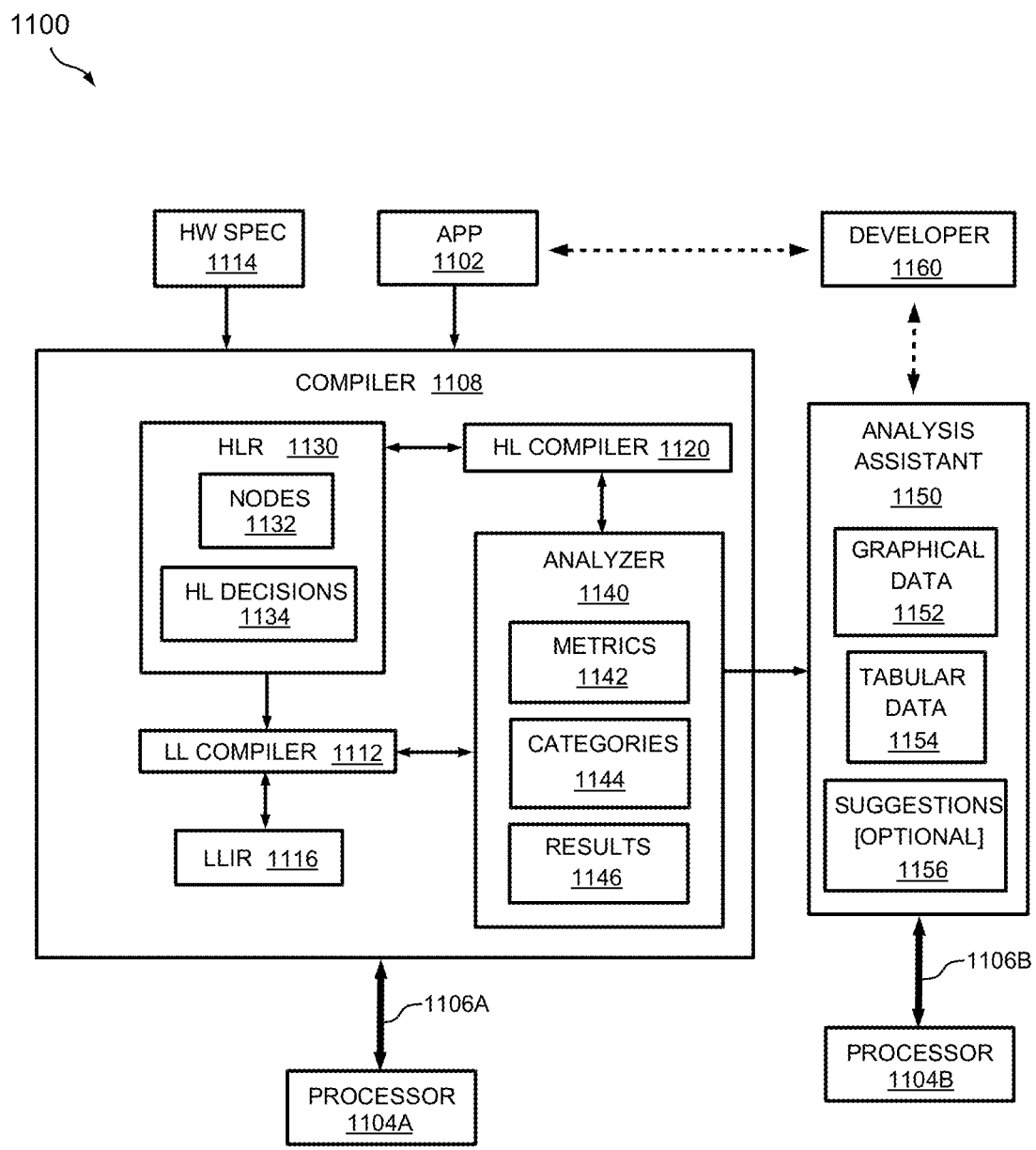
FIG. 11 illustrates an example system for compiling a dataflow application and analyzing compilation results, according to aspects of the disclosure.

FIG. 11 illustrates an example system for performing methods and/or operations of the disclosure, such as method 900 and/or 1000, and/or methods similar or equivalent to methods 900, 1000, and/or operations thereof. In FIG. 11, computing system 1100 is shown comprising application APP 1102, compiler 1108, developer 1160, analysis assistant 1150, and processors 1104A and 1104B.

In implementations, APP 1102 can comprise, for example, a data-parallel applications, such as neural networks, neural networks, and various applications for performing functions such as machine learning, natural language processing, image, video, and/audio processing, for example. developer 1160 can comprise a human and/or automated (e.g., a by a computing application, such as an AI application for developing applications) application developer, or programmer, to develop or write APP 1102. Analysis assistant 1150 can interact with developer 1160 to identify and/or correct inefficiencies in APP 1102.

Processors 1104A and 1104B (collectively, "processors 1104") can be any processor, and/or a computing system including a processor, that can execute programs of a compiler such as compiler 1108. Processor 1104A is shown coupled to compiler 1108 by means of interface 1106A and processor 1104B is shown coupled to analysis assistant 1150 by means of interface 1106B. Interface 1106A can be, for example, an API for executing compiler 1108 on processor 1104A, for compiler 1108 to receive input data, such as APP 1102, and/or for compiler 1108 to output data, such as a graph and/or an alternative IR, of an application incorporating compiler high level decisions.

Interface 1106B can be, for example, an API for executing analysis assistant 1150 on processor 1104B, for analysis assistant 1150 to receive input data, such as input data from compiler 1108 and/or developer 1160, and/or for analysis assistant 1150 to output data, such as a inefficiency results and/or suggestions to developer 1160, a storage device or system, compiler 1108, and/or a computing system communicatively coupled to analysis assistant 1150 or a computing system on which analysis assistant 1150 can execute. Processors 1104A and 1104B can be the same processor, or can be different processors. Interfaces 1106A and 1106B can be the same interfaces and/or can be different interfaces and can comprise a variety of interfaces, such as APIs, CLIs, communications interfaces, data buses, I/O buses or links, network interfaces, and so forth.

In implementations, compiler 1108 can be, compiler for compiling an application to execute on a dataflow computing system, such as a CGRS compiler for compiling an application for execution on a CGRS, and/or on CGR hardware of a CGRS. Compiler 1108 can comprise, for example, a compiler that can perform methods similar or equivalent to method 500 of FIG. 5, method 900 of FIG. 9, and/or method 1000 of FIG. 10. Compiler 1108 can compile APP 1102 for execution on CGR hardware.

Compiler 1108 is shown in FIG. 11 comprising, HL compiler 1120, HLR 1130, LL compiler 1112, LLIR 1116, hardware specifications HW SPEC 1114, and analyzer 1140. In implementations, HLR 1130 can comprise a graph corresponding to APP 1102. Compiler 1108 can receive APP 1102 (e.g., via interface 1106A or, another interface of compiler 1108 not shown in FIG. 11, such as an API for compiler 1108 to receive or to otherwise access APP 1102)

and compiler 1108 can generate HLR 1130 based on APP 1102. Alternatively, compiler 1108 can receive HLR 1130, such as from a storage device or memory storing HLR 1130 (e.g., storage or memory storing HLR 1130 from a prior creation of HLR 1130). HLR 1130 can comprise an auxiliary graph, and/or can be generated by compiler 1108.

HL compiler 1120 can be a component (of, function) of compiler 1108 that can compiler an application, or an application graph, such as a graph included in HLR 1114, to an HLR that can include high level execution decisions mapping an application to CGR hardware for execution. HL compiler 1120 can comprise high level decision components (or, functions) to perform tiling, parallelizing, sectioning, and/or scheduling of operations of APP 1102, which can individually and/or in combination determine high level execution alternatives and/or decisions. HL compiler 1120 can utilize a hardware description, such as HW SPEC 1114, to assist in determining high level execution decisions.

HLR 1130 is, correspondingly, shown in FIG. 11 comprising nodes 1132 and HL decisions 1134. In implementations, Nodes 1132 can represent or correspond to operators, and/or operands/results of operators, of APP 1102. HLR 1130 can describe a topology of nodes 1132 (e.g., a topology of operators, and/or dataflow among the operators, of APP 1102. HL decisions 1134 can comprise high level execution alternatives and/or decisions, such as high level execution alternatives/decisions computed by HL compiler 1120.

LL compiler 1112 can comprise a component (or, function) of compiler 1108 that can compile an HLR to an LLIR. For example, in FIG. 11 LL compiler 1112 can compile HL compiler 1120 to LLIR 1116, which can be an LLIR such as previously described in reference to FIGS. 6 and 7. LL compiler 1112 can analyze LLIR 1112 to evaluate execution metrics of compiling HLR 1130 to low level hardware constructs. In combination, HL compiler 1120 and LL compiler 1112 can perform iterative evaluations of high level execution decisions and can determine more, and less, optimal high level decisions among them. In implementations, compiler 1108, HL compiler 1120, and LL compiler 1112 can be software elements (programs), hardware elements (e.g., special purpose compilation and/or graph processors or circuits), or a combination of software and hardware elements.

In implementations analyzer 1140 can be an application analyzer such as previously described. For example, analyzer 1140 can perform a method similar or equivalent to method 900, and/or steps thereof, and can analyze APP 1102 (e.g., as represented by HLR 1130 and/or LLIR 1116) to predict hardware execution of APP 1102 on CGR hardware and/or determine application inefficiencies. In FIG. 11, analyzer 1140 is shown comprising metrics 1142, which can include inefficiency metrics such as previously described, and categories 1144, which can include inefficiency categories such as previously described. Analyzer 1140 is shown further including results 1146, which can comprise inefficiency results produced by analyzing APP 1102 for inefficiencies associated with execution on particular CGR hardware, such as hardware described in HW SPEC 1114.

In FIG. 11, analysis assistant 1150 can be an analysis assistant such as previously described. For example, analysis assistant 1150 can perform a method similar or equivalent to method 1000 of FIG. 10, and/or steps thereof. Analysis assistant 1150 can, for example, present results 1146 (or, alternative inefficiency results) determined by analyzer 1140. Analysis assistant 1150 can present inefficiency results and/or suggestions to developer 1160, and can interact (e.g., via an interface similar or equivalent to interface 1106B) with developer 1160.

FIG. 11 shows analysis assistant 1150 comprising graphical data 1152, tabular data 1154, and optional suggestions 1156. In implementations, optional suggestions 1156 can be suggestions to improve inefficiencies determined by an analyzer, such as such as results 1146, determined by an analyzer, such as analyzer 1140. Graphical data 1152 can comprise graphical data (and/or, data to generate graphical output) corresponding to inefficiency results, such as results 1146, determined by an analyzer, such as analyzer 1140. Graphical data 1152 can comprise graphical data (and/or, data to generate graphical output) corresponding to suggestions, such as optional suggestions 1156. Tabular data 1154 can comprise tabular data (and/or, data to generate tabular output) corresponding to inefficiency results, such as results 1146, determined by an analyzer, such as analyzer 1140. Tabular data 1154 can comprise tabular data (and/or, data to generate tabular output) corresponding to suggestions, such as optional suggestions 1156.

While FIG. 11 depicts analyzer 1140 as included in compiler 1108, and analysis assistant 1150 as a component of a system separate from compiler 1108, this is for purposes only of illustrating the disclosure and not intended to limit implementations. It would be apparent to one of ordinary skill in the art that, in implementations, analyzer 1140 need not be a component of compiler 1108, that analysis assistant 1150 can be a component of compiler 1108, and/or that any or all of compiler 1108, analyzer 1140, and analysis assistant 1150 can be implemented in any combination and/or structural arrangement of computing systems and/or components thereof. It would be equally apparent to one of ordinary skill in the art that such a system can comprise a variety of components, and/or arrangements of components, alternative to the example of FIG. 11, that such alternative components/arrangements can perform iterative compilation methods and/or operations of the disclosure, and that such alternative implementations will be within the scope and spirit of the disclosure.

While not shown explicitly in FIG. 11, in computing system 1100 HW SPEC 1114, HLR 1114, LLIR 1116, metrics 1142, categories 1144, results 1146, graphical data 1152, tabular data 1154, and/or optional suggestions 1156, and/or components of these, can be stored in a storage medium and/or memory included (but, not shown explicitly) in, or coupled to, computing system 1100, and/or accessible to processor 1104. Programming instructions for compiler 1108, HL compiler 1120, LL compiler 1112, analyzer 1140, and/or analysis assistant 1150, such as to perform methods and/or operations of the disclosure, can be stored in a storage medium and/or memory included (but, not shown explicitly) in, or coupled to, computing system 1100, and/or accessible to processors 1104A and/or 1104B.

In implementations, a storage medium can comprise any form of persistent memory or medium, such as a disk or optical storage device, or a storage medium of a computer storage subsystem. A memory can comprise any computer memory that can be accessible to compiler 1108, and/or processors 1104A and/or 1104B while executing programs of compiler 1108, analyzer 1140, and/or analysis assistant 1150. For example, while not shown explicitly in FIG. 11, computing system 1100 can include a main memory, on-chip and/or off-chip memories of a CGRA, cache memories, and/or memories of a CGRS (e.g., PMUs, DRAMs, and/or SRAMs).

In implementations, an apparatus including a memory and at least one processor coupled to the memory, can perform example methods, and/or operations thereof, of the disclosure. Implementations can comprise a means for carrying out example methods, and/or operations thereof, of the disclosure; the means can include (i) hardware module(s), (ii) software module(s) executing on one or more hardware processors, or (iii) a combination of hardware and software modules; any of (i)-(iii) configured to implement example methods, and/or operations thereof, of the disclosure, and in which the software modules are stored in a computer readable storage medium (or multiple such media).

Implementations can comprise a computer program product and can include a computer readable storage medium (or media) having computer readable program instructions of the computer program product incorporated therein. It will be understood by one of ordinary skill in the art that computer readable program instructions can implement each or any combination of operations and/or structure of the disclosure, such as illustrated by the drawings and described herein.

The computer readable program instructions can be provided to one or more processors, and/or other elements, of a computing system or apparatus to produce a machine which can execute, via the processor(s), to implement operations and/or actions similar or equivalent to those of the disclosure. The computer readable program instructions can be stored in a computer readable storage medium that can direct one or more processors, and/or other elements, of a computing system or apparatus to function in a particular manner, such that the computer readable storage medium comprises an article of manufacture including instructions to implement operations and/or structures similar or equivalent to those of the disclosure.

The computer readable program instructions of the computer program product can cause one or more processors to perform operations of the disclosure. A sequence of program instructions, and/or an assembly of one or more interrelated programming modules, of the computer program product can direct one or more one or more processors and/or computing elements of a computing system to implement the elements and/or operations of the disclosure including, but not limited to, the structures and operations illustrated and/or described in the present disclosure.

A computer readable storage medium can comprise any tangible (e.g., hardware) device, or combination of tangible devices, that can store instructions of the computer program product and that can be read by a computing element to download the instructions for use by a processor. A computer readable storage medium can comprise, but is not limited to, electronic, magnetic, optical, electromagnetic, and/or semiconductor storage devices, or any combination of these. A computer readable storage medium can comprise a portable storage medium, such as a magnetic disk/diskette, optical disk (CD or DVD); a volatile and/or non-volatile memory; a memory stick, a mechanically encoded device, and any combination of these. A computer readable storage medium, as used herein, is not to be construed as being transitory signals per se, such as electrical signals transmitted through a wire, radio waves or other freely propagating electromagnetic waves, or electromagnetic waves propagating through a wave transmission medium (e.g., a wave guide or fiber-optic cable).

The computer readable program instructions can be communicated from the computer readable storage medium to the one or more computing/processing devices, via a programming API of a computing system, and/or a communications interface of a computing system, having access to the computer readable storage medium, and/or a programming API of a computing system, and/or a communications interface of the one or more computing/processing devices. The API(s) and/or communications interface(s) can couple communicatively and/or operatively to a network, such as the Internet, a local area network, a wide area network, and/or a wireless network. The API(s) and/or communications interface(s) can receive the computer readable program instructions read from computer readable storage medium and can forward the computer readable program instructions to the one or more computing/processing devices via the API(s), communications interface(s), and/or network.

The computer readable program instructions of the computer program product can comprise machine language and/or assembly language instructions, instruction-set-architecture (ISA) instructions, microcode and/or firmware instructions, state-setting data, configuration data for integrated circuitry, source code, and/or object code. The instructions and/or data can be written in any combination of one or more programming languages.

The computer readable program instructions can execute entirely, or in part, on a user's computer, as a stand-alone software package; partly on a user's computer and partly on a remote computer; or, entirely on a remote computer. A remote computer can be connected to a user's computer through any type of network, including a local area network (LAN) or a wide area network (WAN). In implementations, electronic circuitry including, for example, FPGA, PLAs, and or CGRPs can execute the computer readable program instructions by utilizing state information of the computer readable program instructions to configure the electronic circuitry to perform operations or elements of the disclosure, such as illustrated by the drawings and described herein.

In implementations, computer readable program instructions can also be loaded onto a computing system, or component(s) thereof, to cause the computing system and/or component(s) thereof to perform a series of operational steps to produce a computer implemented process, such that the instructions which execute on the computing system, or component(s) thereof, implement the operations or elements of the disclosure, such as illustrated by the drawings and described herein.

The flowchart and block diagrams in the Drawings and Incorporations illustrate the architecture, functionality, and operation of possible implementations of systems, methods, and computer program products according to various implementations of the present invention. Individual elements illustrated in the Figures—such as individual operations illustrated in the flowcharts or individual blocks of block diagrams—can represent a module, segment, or portion of executable instructions for implementing the disclosed function(s). In various alternative implementations, particular operations can occur in an order differing from that illustrated in the examples of the drawings. For example, two operations shown in succession in a diagram of the disclosure may, in a particular implementation, be executed substantially concurrently, or can sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

In implementations, features of the disclosure, and/or elements of features of the disclosure, can be combined. In the interest of conciseness, such combinations are not individually enumerated and are not repeated with each base set of features. One of ordinary skill in the art will appreciate how various individual features of the disclosure can be readily combined with sets of base features identified in various example implementations. Features of the disclosure, and/or elements of features of the disclosure, are not meant to be mutually exclusive, exhaustive, or restrictive in implementations. Further, the disclosure is not limited to these features but rather encompasses all possible combinations, modifications, equivalents, and variations within the scope of the disclosure.

Terminology used herein, and the examples disclosed, are chosen to illustrate the principles of the implementations, the practical application or technical improvement over alternative technologies, and to enable others of ordinary skill in the art to understand the implementations disclosed herein. The disclosure illustrates various example implementations, and the examples are intended to illustrate principles and aspects of the disclosure, but are not intended to limit implementations, nor intended to be exhaustive of implementations that can be conceived within the scope of the disclosure. It would be apparent to one of ordinary skill in the art that alternative implementations can comprise modifications and combinations within the spirit of the disclosure and the scope of the claims.

As can be seen in the foregoing examples, features of the disclosure can comprise methods and apparati of computing systems. A summary of example implementations of such features includes:

Example Implementation 1

A method comprises: performing, by a compiler included in a first computing system, a trial compilation of a first high level decision to a first LLIR (low level intermediate representation), the first high level decision among high level decisions to execute a dataflow application on a second computing system, the first LLIR comprising first hardware resources of the second computing system to execute the dataflow application based on the first high level decision; determining, by the compiler, first low level execution metrics associated with the first hardware resources included, by the trial compilation of the first high level decision, in the first LLIR; and, determining, by the compiler, based on the first low level execution metrics, a first trial result.

The method further comprises performing, by the compiler, a trial compilation of a second high level decision, among the high level decisions, to a second LLIR comprising second hardware resources of the second computing system to execute the dataflow application based on the second high level decision; determining, by the compiler, second low level execution metrics associated with the second hardware resources included, by the trial compilation of the second high level decision, in the second LLIR; determining, by the compiler, based on the second low level execution metrics, a second trial result; evaluating, by the compiler, based on a first execution objective, the first trial result; evaluating, by the compiler, based on a second execution objective, the second trial result; and, selecting, by the compiler, based on the evaluating the first trial result and the evaluating the second trial result, at least one of the first high level decision and the second high level decision for executing the dataflow application on the second computing system.

Example Implementation 2

The example of implementation 1, wherein the evaluating the first trial result based on the first execution objective comprises comparing a metric among the first low level execution metrics to an application execution objective.

Example Implementation 3

The example of implementation 2, wherein the first execution objective is selected from a group consisting of: increasing utilization of third hardware resources of the second computing system to execute the dataflow application; increasing parallelism of fourth hardware resources of the second computing system to execute the dataflow application; and, decreasing execution latency of the second computing system to execute the dataflow application.

Example Implementation 4

The example of implementation 1, 1, the method further comprising determining, by the compiler, based on the evaluating the first trial result, a modification of the first high level decision.

Example Implementation 5

The example of implementation 4, the method further comprising:
performing, by the compiler, a trial compilation of the modification of the first high level decision to a third LLIR comprising third hardware resources of the second computing system to execute the dataflow application based on the modification of the first high level decision; determining, by the compiler, third low level execution metrics associated with the third hardware resources included, by the trial compilation of the modification of the first high level decision, in the third LLIR; determining, by the compiler, based on the third low level execution metrics, a third trial result; and, evaluating the third trial result, by the compiler, based on a third execution objective associated with executing the dataflow application on the second computing system.

Example Implementation 6

The example of implementation 1, the method further comprising discarding, by the compiler, based on the evaluating the first trial result and the evaluating the second trial result, at least one of the first high level decision and the second high level decision from among the high level decisions to execute the dataflow application on the second computing system.

Example Implementation 7

The example of implementation 1, wherein the first high level decision corresponds to executing a section cut included in an HLR of the dataflow application.

Example Implementation 8

A computer program product, the computer program product comprising a computer readable storage medium having program instructions embodied therewith, wherein the program instructions are executable by at least one processor of a first computing system to cause the at least one processor to: perform a trial compilation of a first high level decision to a first LLIR (low level intermediate representation), the first high level decision among high level decisions to execute a dataflow application on a second computing system, the first LLIR comprising first hardware resources of the second computing system to execute the dataflow application based on the first high level decision; determine first low level execution metrics associated with the first hardware resources included, by the trial compilation of the first high level decision, in the first LLIR; NS, determine, based on the first low level execution metrics, a first trial result.

The program instructions can further cause the at least one processor to: perform a trial compilation of a second high level decision, among the high level decisions, to a second LLIR comprising second hardware resources of the second computing system to execute the dataflow application based on the second high level decision; determine second low level execution metrics associated with the second hardware resources included, by the trial compilation of the second high level decision, in the second LLIR; determine, based on the second low level execution metrics, a second trial result; evaluate, based on a first execution objective, the first trial result; evaluate, based on a second execution objective, the second trial result; and, select, based on the evaluating the first trial result and the evaluating the second trial result, at least one of the first high level decision and the second high level decision for executing the dataflow application on the second computing system.

Example Implementation 9

The example of implementation 8, wherein the program instructions are executable by the at least one processor to further cause the at least one processor to: determine, based on evaluating the first trial result, a modification of the first high level decision; perform, a trial compilation of the modification of the first high level decision to a third LLIR comprising third hardware resources of the second computing system to execute the dataflow application based on the modification of the first high level decision; determine third low level execution metrics associated with the third hardware resources included, by the trial compilation of the modification of the first high level decision, in the third LLIR; determine, based on the third low level execution metrics, a third trial result; and, evaluate, based on a third execution objective associated with executing the dataflow application on the second computing system.

Example Implementation 10

The example of implementation 8, wherein the program instructions are executable by the at least one processor to further cause the at least one processor to discard, based on the evaluating the first trial result and the evaluating the second trial result, at least one of the first high level decision and the second high level decision from among the high level decisions to execute the dataflow application on the second computing system.

Example Implementation 11

A first computing system comprises an HLR (high level representation) of a dataflow application; an HL (high level) compiler executable on a first processor of the first computing system, wherein the HL compiler is configured to determine, based on the HLR, high level decisions to execute the dataflow application on a second computing system; and, an LL (low level) compiler executable on a second processor of the first computing system.

The LL compiler is configured to: perform a trial compilation of a first high level decision, among the high level decisions, to a first LLIR (low level intermediate representation), the first LLIR comprising first hardware resources of the second computing system to execute the dataflow application based on the first high level decision; determine first low level execution metrics associated with the first hardware resources included, by the trial compilation of the first high level decision, in the first LLIR; determine, based on the first low level execution metrics, a first trial result; perform a trial compilation of a second high level decision, among the high level decisions, to a second LLIR comprising second hardware resources of the second computing system to execute the dataflow application based on the second high level decision; determine second low level execution metrics associated with the second hardware resources included, by the trial compilation of the second high level decision, in the second LLIR; determine, based on the second low level execution metrics, a second trial result; and, communicate, to the HL compiler, the first trial result and the second trial result.

The HL compiler is further configured to: evaluate, based on a first execution objective, the first trial result; evaluate, based on a second execution objective, the second trial result; and, select, based on the evaluating the first trial result and the evaluating the second trial result, at least one of the first high level decision and the second high level decision for executing the dataflow application on the second computing system.

Example Implementation 12

The example of implementation 11, wherein the LL compiler configured to evaluate the first trial result based on the first execution objective comprises the LL compiler further configured to evaluate the first trial result by comparing a metric among the first low level execution metrics to a first application execution objective; and, wherein the LL compiler configured to evaluate the second trial result based on the second execution objective comprises the LL compiler further configured to evaluate the second trial result by comparing a metric among the second low level execution metrics to a second application execution objective.

Example Implementation 13

The example of implementation 11, wherein the computing system further comprises a hardware specification comprising a specification of the first hardware resources and the second hardware resources; and, wherein the LL compiler configured to determine the first low level execution metrics and to determine the second low level execution metrics comprises LL compiler configured to determine the first low level execution metrics and to determine the second low level execution metrics based on the hardware specification.

Example Implementation 14

The example of implementation 11, wherein the HL compiler is further configured to determine, based on evaluating the first trial result, a modification of the first high level decision.

Example Implementation 15

The example of implementation 14, wherein the LL compiler is further configured to: perform a trial compilation of the modification of the first high level decision to a third LLIR comprising third hardware resources of the second computing system to execute the dataflow application based on the modification of the first high level decision; determine third low level execution metrics associated with the third hardware resources included, by the trial compilation of the modification of the first high level decision, in the third LLIR; determine, based on the third low level execution metrics, a third trial result; and, wherein the HL compiler is further configured to evaluate the third trial result based on a third execution objective associated with executing the dataflow application on the second computing system.

Example Implementation 16

The example of implementation 11, wherein the HL compiler is further configured to discard, based on evaluating the first trial result and evaluating the second trial result, at least one of the first high level decision and the second high level decision from among the high level decisions to execute the dataflow application on the second computing system.

Example Implementation 17

The example of implementation 11, wherein and the first high level decision is associated with executing a section cut included in the HLR.

Example Implementation 18

The example of implementation 11, wherein the HL compiler configured to evaluate the first trial result based on the first execution objective comprises the HL compiler further configured to evaluate the first trial result by comparing a metric, among the first low level execution metrics, to an application execution objective.

Example Implementation 19

The example of implementation 11, wherein the first execution objective is selected from a group consisting of: increasing utilization of third hardware resources of the second computing system to execute the dataflow application; increasing parallelism of fourth hardware resources of the second computing system to execute the dataflow application; and, decreasing execution latency of the second computing system to execute the dataflow application.

Example Implementation 20

The example of implementation 11, wherein a metric among the first low level execution metrics is selected from a group consisting of: a number of processors among the first hardware resources to execute the dataflow application based on the first high level decision; a number of parallel computations to execute the dataflow application based on the first high level decision; an execution latency of a processor among the first hardware resources to execute the dataflow application based on the first high level decision; a size a memory among the first hardware resources to execute the dataflow application based on the first high level decision; and, a data transfer latency among memories of the first hardware resources to execute the dataflow application based on the first high level decision.

What is claimed is:

1. A method, the method comprising:
performing, by a compiler included in a first computing system, a trial compilation of a first high level decision to a first LLIR (low level intermediate representation), the first high level decision among high level decisions to execute a dataflow application on a second computing system, the first LLIR comprising first hardware resources of the second computing system to execute the dataflow application based on the first high level decision;
determining, by the compiler, first low level execution metrics associated with the first hardware resources included, by the trial compilation of the first high level decision, in the first LLIR;
determining, by the compiler, based on the first low level execution metrics, a first trial result;
performing, by the compiler, a trial compilation of a second high level decision, among the high level decisions, to a second LLIR comprising second hardware resources of the second computing system to execute the dataflow application based on the second high level decision;
determining, by the compiler, second low level execution metrics associated with the second hardware resources included, by the trial compilation of the second high level decision, in the second LLIR;
determining, by the compiler, based on the second low level execution metrics, a second trial result;
evaluating, by the compiler, based on a first execution objective, the first trial result;
evaluating, by the compiler, based on a second execution objective, the second trial result; and,
selecting, by the compiler, based on the evaluating the first trial result and the evaluating the second trial result, at least one of the first high level decision and the second high level decision for executing the dataflow application on the second computing system.

2. The method of claim 1, wherein the evaluating the first trial result based on the first execution objective comprises comparing a metric among the first low level execution metrics to an application execution objective.

3. The method of claim 2, wherein the first execution objective is selected from a group consisting of: increasing utilization of third hardware resources of the second computing system to execute the dataflow application; increasing parallelism of fourth hardware resources of the second computing system to execute the dataflow application; and, decreasing execution latency of the second computing system to execute the dataflow application.

4. The method of claim 1, the method further comprising determining, by the compiler, based on the evaluating the first trial result, a modification of the first high level decision.

5. The method of claim 4, the method further comprising:
performing, by the compiler, a trial compilation of the modification of the first high level decision to a third LLIR comprising third hardware resources of the second computing system to execute the dataflow application based on the modification of the first high level decision;

determining, by the compiler, third low level execution metrics associated with the third hardware resources included, by the trial compilation of the modification of the first high level decision, in the third LLIR;

determining, by the compiler, based on the third low level execution metrics, a third trial result; and, evaluating the third trial result, by the compiler, based on a third execution objective associated with executing the dataflow application on the second computing system.

6. The method of claim 1, the method further comprising discarding, by the compiler, based on the evaluating the first trial result and the evaluating the second trial result, at least one of the first high level decision and the second high level decision from among the high level decisions to execute the dataflow application on the second computing system.

7. The method of claim 1, wherein the first high level decision corresponds to executing a section cut included in an HLR of the dataflow application.

8. A computer program product, the computer program product comprising a computer readable storage medium having program instructions embodied therewith, wherein the program instructions are executable by at least one processor of a first computing system to cause the at least one processor to:

perform a trial compilation of a first high level decision to a first LLIR (low level intermediate representation), the first high level decision among high level decisions to execute a dataflow application on a second computing system, the first LLIR comprising first hardware resources of the second computing system to execute the dataflow application based on the first high level decision;

determine first low level execution metrics associated with the first hardware resources included, by the trial compilation of the first high level decision, in the first LLIR;

determine, based on the first low level execution metrics, a first trial result;

perform a trial compilation of a second high level decision, among the high level decisions, to a second LLIR comprising second hardware resources of the second computing system to execute the dataflow application based on the second high level decision;

determine second low level execution metrics associated with the second hardware resources included, by the trial compilation of the second high level decision, in the second LLIR;

determine, based on the second low level execution metrics, a second trial result;

evaluate, based on a first execution objective, the first trial result;

evaluate, based on a second execution objective, the second trial result; and, select, based on the evaluating the first trial result and the evaluating the second trial result, at least one of the first high level decision and the second high level decision for executing the dataflow application on the second computing system.

9. The computer program product of claim 8, wherein the program instructions are executable by the at least one processor to further cause the at least one processor to:

determine, based on evaluating the first trial result, a modification of the first high level decision;

perform, a trial compilation of the modification of the first high level decision to a third LLIR comprising third hardware resources of the second computing system to execute the dataflow application based on the modification of the first high level decision;

determine third low level execution metrics associated with the third hardware resources included, by the trial compilation of the modification of the first high level decision, in the third LLIR;

determine, based on the third low level execution metrics, a third trial result; and, evaluate, based on a third execution objective associated with executing the dataflow application on the second computing system.

10. The computer program product of claim 8, wherein the program instructions are executable by the at least one processor to further cause the at least one processor to discard, based on the evaluating the first trial result and the evaluating the second trial result, at least one of the first high level decision and the second high level decision from among the high level decisions to execute the dataflow application on the second computing system.

11. A first computing system comprising: one or more processors, and an HLR (high level representation) of a dataflow application;

an HL (high level) compiler executable on a first processor of the first computing system, wherein the HL compiler is configured to determine, based on the HLR, high level decisions to execute the dataflow application on a second computing system; and, an LL (low level) compiler executable on a second processor of the first computing system, wherein the LL compiler is configured to:

perform a trial compilation of a first high level decision, among the high level decisions, to a first LLIR (low level intermediate representation), the first LLIR comprising first hardware resources of the second computing system to execute the dataflow application based on the first high level decision;

determine first low level execution metrics associated with the first hardware resources included, by the trial compilation of the first high level decision, in the first LLIR;

determine, based on the first low level execution metrics, a first trial result;

perform a trial compilation of a second high level decision, among the high level decisions, to a second LLIR comprising second hardware resources of the second computing system to execute the dataflow application based on the second high level decision;

determine second low level execution metrics associated with the second hardware resources included, by the trial compilation of the second high level decision, in the second LLIR;

determine, based on the second low level execution metrics, a second trial result;

and, communicate, to the HL compiler, the first trial result and the second trial result; wherein the HL compiler is further configured to:

evaluate, based on a first execution objective, the first trial result;

evaluate, based on a second execution objective, the second trial result; and, select, based on the evaluating the first trial result and the evaluating the second trial result, at least one of the first high level decision and the second high level decision for executing the dataflow application on the second computing system.

12. The first computing system of claim 11, wherein the LL compiler configured to evaluate the first trial result based on the first execution objective comprises the LL compiler further configured to evaluate the first trial result by comparing a metric among the first low level execution metrics to a first application execution objective; and,
wherein the LL compiler configured to evaluate the second trial result based on the second execution objective comprises the LL compiler further configured to evaluate the second trial result by comparing a metric among the second low level execution metrics to a second application execution objective.

13. The first computing system of claim 11, wherein the computing system further comprises a hardware specification comprising a specification of the first hardware resources and the second hardware resources; and,
wherein the LL compiler configured to determine the first low level execution metrics and to determine the second low level execution metrics comprises LL compiler configured to determine the first low level execution metrics and to determine the second low level execution metrics based on the hardware specification.

14. The first computing system of claim 11, wherein the HL compiler is further configured to determine, based on evaluating the first trial result, a modification of the first high level decision.

15. The first computing system of claim 14, wherein the LL compiler is further configured to: perform a trial compilation of the modification of the first high level decision to a third LLIR comprising third hardware resources of the second computing system to execute the dataflow application based on the modification of the first high level decision;
determine third low level execution metrics associated with the third hardware resources included, by the trial compilation of the modification of the first high level decision, in the third LLIR;
determine, based on the third low level execution metrics, a third trial result; and,
wherein the HL compiler is further configured to evaluate the third trial result based on a third execution objective associated with executing the dataflow application on the second computing system.

16. The first computing system of claim 11, wherein the HL compiler is further configured to discard, based on evaluating the first trial result and evaluating the second trial result, at least one of the first high level decision and the second high level decision from among the high level decisions to execute the dataflow application on the second computing system.

17. The first computing system of claim 11, wherein and the first high level decision is associated with executing a section cut included in the HLR.

18. The first computing system of claim 11, wherein the HL compiler configured to evaluate the first trial result based on the first execution objective comprises the HL compiler further configured to evaluate the first trial result by comparing a metric, among the first low level execution metrics, to an application execution objective.

19. The first computing system of claim 11, wherein the first execution objective is selected from a group consisting of: increasing utilization of third hardware resources of the second computing system to execute the dataflow application; increasing parallelism of fourth hardware resources of the second computing system to execute the dataflow application; and, decreasing execution latency of the second computing system to execute the dataflow application.

20. The first computing system of claim 11, wherein a metric among the first low level execution metrics is selected from a group consisting of: a number of processors among the first hardware resources to execute the dataflow application based on the first high level decision; a number of parallel computations to execute the dataflow application based on the first high level decision; an execution latency of a processor among the first hardware resources to execute the dataflow application based on the first high level decision; a size a memory among the first hardware resources to execute the dataflow application based on the first high level decision; and, a data transfer latency among memories of the first hardware resources to execute the dataflow application based on the first high level decision.

* * * * *